US012674008B2

(12) United States Patent
Matsuura et al.

(10) Patent No.: US 12,674,008 B2
(45) Date of Patent: Jul. 7, 2026

(54) HOLLOW RESIN PARTICLES, METHOD FOR PRODUCING HOLLOW RESIN PARTICLES, AND USE OF HOLLOW RESIN PARTICLES

(71) Applicant: SEKISUI KASEI CO., LTD., Osaka (JP)

(72) Inventors: Haruhiko Matsuura, Osaka (JP); Shinya Matsuno, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 71 days.

(21) Appl. No.: 18/267,285

(22) PCT Filed: Dec. 9, 2021

(86) PCT No.: PCT/JP2021/045347
§ 371 (c)(1),
(2) Date: Jun. 14, 2023

(87) PCT Pub. No.: WO2022/131127
PCT Pub. Date: Jun. 23, 2022

(65) Prior Publication Data
US 2023/0391900 A1     Dec. 7, 2023

(30) Foreign Application Priority Data

Dec. 17, 2020    (JP) ................................. 2020-209335

(51) Int. Cl.
*C08F 12/36*          (2006.01)
*C09D 5/00*           (2006.01)
(Continued)

(52) U.S. Cl.
CPC ................ *C08F 12/36* (2013.01); *C09D 5/00* (2013.01); *C09D 5/24* (2013.01); *C09D 125/16* (2013.01); *H01B 3/30* (2013.01)

(58) Field of Classification Search
None
See application file for complete search history.

(56) References Cited

U.S. PATENT DOCUMENTS

| | | |
|---|---|---|
| 4,782,098 A | 11/1988 | Allen et al. |
| 8,574,669 B2 | 11/2013 | Asano et al. |

(Continued)

FOREIGN PATENT DOCUMENTS

| | | |
|---|---|---|
| CN | 109232890 B | 1/2019 |
| EP | 0 385 065 B1 | 1/1994 |

(Continued)

OTHER PUBLICATIONS

English translation of Ouderkirk et al. (TW 200807034) (Year: 2008).*

(Continued)

*Primary Examiner* — Ronak C Patel
(74) *Attorney, Agent, or Firm* — GREENBLUM & BERNSTEIN, P.L.C.

(57)          ABSTRACT

Provided is a hollow resin particle that has a shell portion and a hollow portion surrounded by the shell portion and that can achieve reductions in dielectricity and dielectric loss tangent and can exhibit excellent heat resistance. In addition, a method for producing such a hollow resin particle in a simple manner is provided. Furthermore, use of such a hollow resin particle is provided. A hollow resin particle according to an embodiment of the present invention is a hollow resin particle including a shell portion and a hollow portion surrounded by the shell portion, wherein the shell portion has an ether structure represented by formula (1).

(Continued)

(a)

(b)

(c)

[Chem. 1]

(1)

18 Claims, 15 Drawing Sheets

(51) Int. Cl.

| | | |
|---|---|---|
| *C09D 5/24* | (2006.01) | |
| *C09D 125/16* | (2006.01) | |
| *H01B 3/30* | (2006.01) | |

(56) References Cited

U.S. PATENT DOCUMENTS

| | | |
|---|---|---|
| 2014/0221511 A1 | 8/2014 | Al-Ghamdi et al. |
| 2016/0145370 A1 | 5/2016 | Kitai et al. |
| 2017/0114243 A1* | 4/2017 | Katayama ............... B01J 13/14 |

FOREIGN PATENT DOCUMENTS

| | | | |
|---|---|---|---|
| JP | S64-65140 | A | 3/1989 |
| JP | H10-279725 | A | 10/1998 |
| JP | 2000-313818 | A | 11/2000 |
| JP | 2001-139663 | A | 5/2001 |
| JP | 2002-80503 | A | 3/2002 |
| JP | 4171489 | B2 | 10/2008 |
| JP | 4445495 | B2 | 4/2010 |
| JP | 2014-529672 | A | 11/2014 |
| JP | 2015-134912 | A | 7/2015 |
| JP | 2017-160399 | A | 9/2017 |
| JP | 6513273 | B1 | 5/2019 |
| WO | 2004/067638 | A1 | 8/2004 |
| WO | 2013/034276 | A1 | 3/2013 |
| WO | 2014/203511 | A1 | 12/2014 |

OTHER PUBLICATIONS

English translation of Matsumura et al. (JP 2009/120806) (Year: 2009).*

English translation of Maenaka et al. (JP 2006-291090) (Year: 2006).*

English translation of Fukuen et al. (JP 2017-160399) (Year: 2017).*

English translation of Ouchi et al. (CN 111902206). (Year: 2020).*

International Search Report issued Mar. 1, 2022 in PCT/JP2021/045347, and English translation thereof.

International Preliminary Report on Patentability issued Jun. 13, 2023 in PCT/JP2021/045347, including Written Opinion issued Mar. 1, 2022, and English translation thereof.

Extended European Search Report (EESR) dated Oct. 18, 2024, issued in European patent application No. 21906490.4.

* cited by examiner (a)

(b)

(c)

HOLLOW RESIN PARTICLES, METHOD FOR PRODUCING HOLLOW RESIN PARTICLES, AND USE OF HOLLOW RESIN PARTICLES

TECHNICAL FIELD

The present invention relates to a hollow resin particle, a production method therefor, and use thereof.

BACKGROUND ART

In order to increase the speed of information processing using electronic devices, attempts have been made to achieve reductions in dielectricity and dielectric loss tangent of an insulating layer of a multilayer printed board. As part thereof, it has been considered to introduce airspace into a resin layer to achieve reductions in dielectricity and dielectric loss tangent by mixing hollow particles each having a shell portion and a hollow portion surrounded by the shell portion into a thermosetting resin.

For example, the hollow resin particles used for such applications are required to have high heat resistance such that the hollow resin particles are not substantially changed even if a thermosetting resin in which the hollow resin particles are mixed is heated when the thermosetting resin is molded or when solder is used.

Also, if moisture is present in the hollow resin particles, the moisture evaporates during the heating described above and becomes outgas, which may impair the reliability of the insulating layer. Therefore, the hollow resin particles used for such applications are required to have a low water absorption ratio.

It has been reported that as hollow resin particles, acrylic hollow resin particles are obtained by subjecting monomers including an acrylic multifunctional monomer, which is typified by trimethylolpropane tri(meth)acrylate or dipentaerythritol hexaacrylate, as a main component to suspension polymerization together with a hydrophobic solvent (Patent Literature 1).

It has been reported that as hollow resin particles, hollow resin particles in each of which a hollow surrounded by a shell is composed of a plurality of hollow regions are obtained by subjecting monomers including an acrylic multifunctional monomer, which is typified by trimethylolpropane tri(meth)acrylate, and an acrylic monofunctional monomer, which is typified by methyl methacrylate, as a main component to suspension polymerization together with a hydrophobic solvent (Patent Literature 2).

It has been reported that as hollow resin particles, styrene-based hollow resin particles are obtained by subjecting divinylbenzene to suspension polymerization together with a saturated hydrocarbon having 8 to 18 carbon atoms (more specifically, hexadecane) (Patent Literature 3).

It has been reported that by blending, as hollow resin particles, hollow resin particles obtained by polymerizing a multifunctional monomer and a monofunctional monomer into a resin, an organic insulating material having excellent insulation characteristics and having a low dielectric constant and a low dielectric loss tangent is made, and as specific monomers, styrene, methyl methacrylate, divinylbenzene, trimethylolpropane tri(meth)acrylate, etc., are used (Patent Literature 4).

As hollow resin particles, styrene-based hollow resin particles in each of which a shell is made of any one of a polymer or copolymer of a crosslinkable monomer and a copolymer of the crosslinkable monomer and a monofunctional monomer and has a single-phase structure, and which are typically obtained by subjecting divinylbenzene to suspension polymerization together with a saturated hydrocarbon having 8 to 18 carbon atoms (more specifically, hexadecane) have been reported, and it has been reported that a resin composition containing the hollow resin particles and a thermosetting resin is suitable for producing a multilayer printed board to be used for an electronic device or the like (Patent Literature 5).

In general, it is known that acrylic resins have high dielectric constant and dielectric loss tangent values, have insufficient heat resistance, and have a high water absorption ratio. Therefore, the acrylic hollow resin particles described in Patent Literature 1 and Patent Literature 2 are not suitable for the purpose of achieving reductions in dielectricity and dielectric loss tangent of the resin layer, the purpose of imparting high heat resistance to the resin layer, and the purpose of reducing the water absorption properties of the resin layer.

The styrene-based hollow resin particles described in Patent Literature 3 are made of a material (crosslinkable polystyrene) having a lower relative dielectric constant and dielectric loss tangent than those of acrylic hollow resin particles. Therefore, the styrene-based hollow resin particles can be said to be effective for the purpose of achieving reductions in dielectricity and dielectric loss tangent of the resin layer. However, since a saturated hydrocarbon having 8 to 18 carbon atoms (specifically, hexadecane) is used for producing the styrene-based hollow resin particles, it is difficult to remove the solvent from the hollow portions by distillation or the like, and the saturated hydrocarbon having 8 to 18 carbon atoms remains in the obtained styrene-based hollow resin particles, so that it is difficult to obtain styrene-based hollow resin particles whose hollow portions are completely replaced with air. In addition, in order to make styrene-based hollow resin particles whose hollow portions are completely replaced with air, the production cost is increased due to the solvent removal described above. Furthermore, the styrene-based hollow resin particles described in Patent Literature 3 have insufficient heat resistance.

As for the hollow resin particles described in Patent Literature 4, a styrene-based monomer and an acrylic monomer having high dielectric constant and dielectric loss tangent values are used in combination, so that the reductions in dielectricity and dielectric loss tangent of the resin layer are insufficient. In addition, Patent Literature 4 indicates a 10% weight loss temperature by TG-DTA measurement in a nitrogen atmosphere under a temperature increase condition of 10° C./min, as an index for heat resistance, and the heat resistance is insufficient.

As for the hollow resin particles described in Patent Literature 5, since a saturated hydrocarbon having 8 to 18 carbon atoms (more specifically, hexadecane) is used for the production thereof as in the styrene-based hollow resin particles described in Patent Literature 3, it is difficult to remove the solvent from the hollow portions by distillation or the like, and the saturated hydrocarbon having 8 to 18 carbon atoms remains in the obtained styrene-based hollow resin particles, so that it is difficult to obtain styrene-based hollow resin particles whose hollow portions are completely replaced with air. In addition, in order to make styrene-based hollow resin particles whose hollow portions are completely replaced with air, the production cost is increased due to the solvent removal described above. Furthermore, the styrene-based hollow resin particles described in Patent Literature 5 have insufficient heat resistance.

3

4

CITATION LIST

Patent Literature

Patent Literature 1: JP 6513273 B1
Patent Literature 2: JP 4445495 B2
Patent Literature 3: JP 2002-080503 A
Patent Literature 4: JP 2000-313818 A
Patent Literature 5: JP 4171489 B2

SUMMARY OF INVENTION

Technical Problem

The present invention has been made in order to solve the problems of the related art described above, and a primary object of the present invention is to provide a hollow resin particle that has a shell portion and a hollow portion surrounded by the shell portion and that can achieve reductions in dielectricity and dielectric loss tangent and can exhibit excellent heat resistance. Another object of the present invention is to provide a method for producing such a hollow resin particle in a simple manner. Still another object of the present invention is to provide use of such a hollow resin particle.

Solution to Problem

According to an embodiment of the present invention, provided is a hollow resin particle including a shell portion and a hollow portion surrounded by the shell portion, wherein the shell portion has an ether structure represented by formula (1).

[Chem. 1]

$$\left[ O - \underset{}{\overset{}{\bigcirc}} \right] \tag{1}$$

In one embodiment, the hollow resin particle according to the embodiment of the present invention has an average particle diameter of 0.1 μm to 50.0 μm.

In one embodiment, the hollow portion is composed of one hollow region.

In one embodiment, the hollow portion is composed of a plurality of hollow regions.

In one embodiment, the hollow portion is composed of a porous structure.

In one embodiment, the hollow resin particle has a 5% thermal weight loss temperature of 300° C. or higher when a temperature of the hollow resin particle is increased at a rate of 10° C./min in a nitrogen atmosphere.

In one embodiment, the hollow resin particle according to the embodiment of the present invention is used for a resin composition for a semiconductor component.

In one embodiment, the hollow resin particle according to the embodiment of the present invention is used for a paint composition.

In one embodiment, the hollow resin particle according to the embodiment of the present invention is used for a heat-insulating resin composition.

In one embodiment, the hollow resin particle according to the embodiment of the present invention is used for a light-diffusible resin composition.

In one embodiment, the hollow resin particle according to the embodiment of the present invention is used for a light-diffusing film.

According to an embodiment of the present invention, provided is a resin composition for a semiconductor component, containing the hollow resin particle according to the embodiment of the present invention.

According to an embodiment of the present invention, provided is a paint composition containing the hollow resin particle according to the present invention.

According to an embodiment of the present invention, provided is a heat-insulating resin composition containing the hollow resin particle according to the embodiment of the present invention.

According to an embodiment of the present invention, provided is a light-diffusible resin composition containing the hollow resin particle according to the embodiment of the present invention.

According to an embodiment of the present invention, provided is a light-diffusing film containing the hollow resin particle according to the embodiment of the present invention.

According to an embodiment of the present invention, provided is a method for producing the hollow resin particle according to the embodiment of the present invention, the method including reacting 20 parts by weight to 80 parts by weight of a compound (A) having an ether structure represented by formula (1) and 80 parts by weight to 20 parts by weight of a monomer (B) which reacts with the compound (A) (a total amount of the compound (A) and the monomer (B) is 100 parts by weight), in an aqueous medium in the presence of a non-reactive solvent.

[Chem. 2]

$$\left[ O - \underset{}{\overset{}{\bigcirc}} \right] \tag{1}$$

Advantageous Effects of Invention

According to the embodiments of the present invention, a hollow resin particle that has a shell portion and a hollow portion surrounded by the shell portion and that can achieve reductions in dielectricity and dielectric loss tangent and can exhibit excellent heat resistance, can be provided. In addition, a method for producing such a hollow resin particle in a simple manner can be provided. Furthermore, use of such a hollow resin particle can be provided.

DESCRIPTION OF EMBODIMENTS

Embodiments of the present invention will be described below, but the present invention is not limited to these embodiments.

<<<<1. Hollow Resin Particle>>>>

<<1-1. Structure and Characteristics of Hollow Resin Particle>>

A hollow resin particle according to an embodiment of the present invention is a hollow resin particle having a shell portion and a hollow portion surrounded by the shell portion. The term "hollow" as used herein means a state where an inside is filled with a substance other than a resin, such as a gas or a liquid, and preferably means a state where the inside is filled with a gas from the standpoint that the effects of the present invention can be exhibited to a greater extent.

Figure 1:
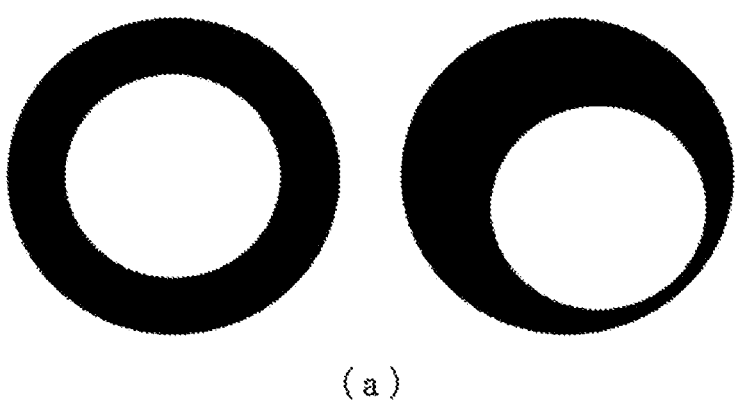
FIG. 1 shows schematic cross-sectional views illustrating the structures of hollow portions.
Figure 1:
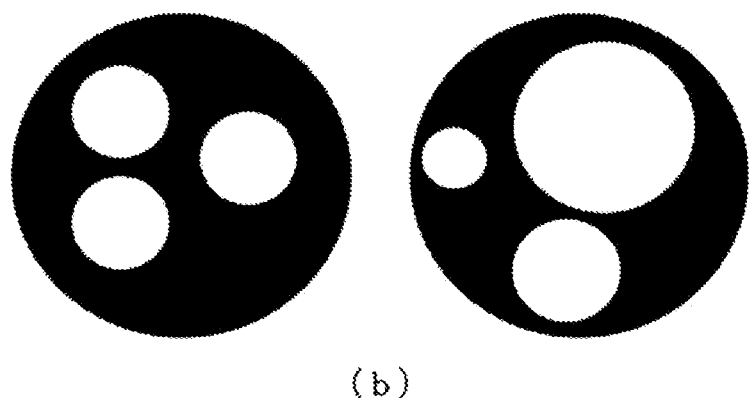
Figure 1:
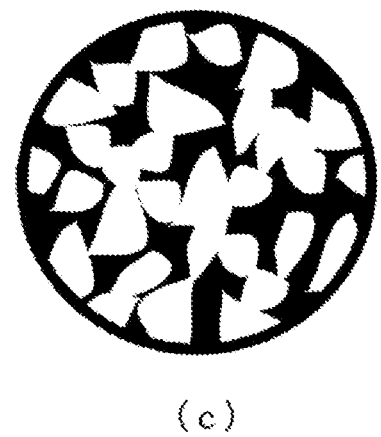

The shell portion and the hollow portion surrounded by the shell portion may be composed of one hollow region as shown in a schematic cross-sectional view in FIG. 1(a), or may be composed of a plurality of hollow regions as shown in a schematic cross-sectional view in FIG. 1(b).

The shell portion and the hollow portion surrounded by the shell portion may be composed of a porous structure as shown in a schematic cross-sectional view in FIG. 1(c). In the case where the hollow portion is a porous structure as described above, the hollow portion may be composed of one hollow region (continuous pore), may be composed of a plurality of hollow regions (independent pores), or may be composed of a mixture thereof.

The average particle diameter of the hollow resin particle according to the embodiment of the present invention is preferably from 0.1 μm to 50.0 μm, more preferably from 0.1 μm to 40.0 μm, further preferably from 0.2 μm to 30.0 μm, and particularly preferably from 0.3 μm to 20.0 μm. When the average particle diameter of the hollow resin particle falls within the above range, the effects of the present invention can be exhibited to a greater extent. If the average particle diameter of the hollow resin particle according to the embodiment of the present invention falls outside of the above range and is excessively small, the thickness of the shell portion is relatively small, which may result in a hollow resin particle that does not have sufficient strength. When the average particle diameter of the hollow resin particle according to the embodiment of the present invention falls outside of the above range and is excessively large, phase separation may be less likely to occur between a polymer produced through polymerization of monomer components during suspension polymerization and a solvent, and thus it may be difficult to form a shell portion.

The hollow resin particle according to the embodiment of the present invention has a 5% thermal weight loss temperature of preferably 300° C. or higher, more preferably 320° C. or higher, further preferably 340° C. or higher, and particularly preferably 360° C. or higher, when the temperature of the hollow resin particle is increased at a rate of in a nitrogen atmosphere. The upper limit of the 5% thermal weight loss temperature is, as a practical matter, preferably 500° C. or lower. If the 5% thermal weight loss temperature of the hollow resin particle according to the embodiment of the present invention when the temperature is increased at a rate of 10° C./min in a nitrogen atmosphere falls within the above range, the hollow resin particle according to the embodiment of the present invention can exhibit excellent heat resistance. If the 5% thermal weight loss temperature of the hollow resin particle according to the embodiment of the present invention when the temperature is increased at a rate of 10° C./min in a nitrogen atmosphere falls outside of the above range and is excessively low, for example, when the hollow resin particle is mixed with a thermosetting resin, the particle may become deformed due to heating for a curing reaction, and an effect of reducing dielectricity and an effect of reducing dielectric loss tangent may be decreased due to loss of the hollow portion.

The hollow resin particle according to the embodiment of the present invention has a moisture content of preferably 0.50 wt % or lower, more preferably 0.45 wt % or lower, further preferably 0.40 wt % or lower, and particularly preferably 0.35 wt % or lower, after the hollow resin particle is allowed to stand for 96 hours in an atmosphere of 40° C. and 95% RH. It is more preferable if the moisture content is lower, and the moisture content is preferably 0 wt % or higher. When the moisture content after the hollow resin particle is allowed to stand for 96 hours in an atmosphere of 40° C. and 95% RH falls within the above range, the effects of the present invention can be exhibited to a greater extent. If the moisture content after the hollow resin particle is allowed to stand for 96 hours in an atmosphere of 40° C. and 95% RH falls outside of the above range and is excessively high, the water absorption ratio of the hollow resin particle may be increased.

<<1-2. Shell Portion>>

The shell portion has an ether structure represented by formula (1).

[Chem. 3]

(1)

The shell portion preferably contains a polymer (P) having an ether structure represented by formula (1). When the shell portion contains such a polymer (P), the effects of the present invention can be exhibited to a greater extent.

As the polymer (P), only one polymer may be used or two or more polymers may be used in combination.

From the standpoint that the effects of the present invention can be exhibited to a greater extent, the content ratio of the polymer (P) in the shell portion is preferably from 60 wt % to 100 wt %, more preferably from 70 wt % to 100 wt %, further preferably from 80 wt % to 100 wt %, and particularly preferably from 90 wt % to 100 wt %.

The shell portion may contain any appropriate other component unless the effects of the present invention are impaired.

<Polymer (P)>

Any appropriate polymer can be adopted as the polymer (P) as long as the polymer has an ether structure represented by formula (1), unless the effects of the present invention are impaired. From the standpoint that the effects of the present invention can be exhibited to a greater extent, such a polymer (P) is preferably a polymer obtained by a reaction of a compound (A) having an ether structure represented by formula (1) and a monomer (B) which reacts with the compound (A).

As the compound (A) having an ether structure represented by formula (1), only one compound may be used, or two or more compounds may be used in combination.

As the monomer (B) which reacts with the compound having an ether structure represented by formula (1), only one monomer may be used, or two or more monomers may be used in combination.

When the total amount of the compound (A) and the monomer (B) is 100 parts by weight, the ratio between compound (A) and the monomer (B) is preferably (20 parts by weight to 80 parts by weight):(80 parts by weight to 20 parts by weight) as a ratio in terms of parts by weight (compound (A):monomer (B)).

In one embodiment, the above ratio is more preferably (50 parts by weight to 80 parts by weight):(50 parts by weight to 20 parts by weight), further preferably (55 parts by weight to 75 parts by weight):(45 parts by weight to 25 parts by weight), and particularly preferably (60 parts by weight to 70 parts by weight):(40 parts by weight to parts by weight).

In another embodiment, the above ratio is more preferably (30 parts by weight to parts by weight):(70 parts by weight to 30 parts by weight), further preferably (35 parts by weight to 65 parts by weight):(65 parts by weight to 35 parts by weight), and particularly preferably (40 parts by weight to 60 parts by weight):(60 parts by weight to parts by weight).

If the content ratio of the compound (A) falls outside of the above range and is excessively small, the heat resistance may be insufficient. If the content ratio of the compound (A) falls outside of the above range and is excessively large, it may be difficult to form a shell portion and a hollow portion surrounded by the shell portion.

Any appropriate compound can be adopted as the compound (A) as long as the compound has an ether structure represented by the formula (1), unless the effects of the present invention are impaired. From the standpoint that the effects of the present invention can be exhibited to a greater extent, such a compound (A) is preferably polyphenylene ether. Examples of commercially available products of polyphenylene ether include trade name "Noryl" (manufactured by SABIC INNOVATIVE PLASTICS IP B.V.), trade name "lupiace" (manufactured by Mitsubishi Chemical Corporation), trade name "Xyron" (manufactured by Asahi Kasei Corporation), and trade name "OPE-2St" (manufactured by MITSUBISHI GAS CHEMICAL COMPANY, INC.).

From the standpoint of compatibility with a non-reactive solvent described later and from the standpoint that a hollow resin particle having excellent heat resistance can be produced in a simpler manner, the polyphenylene ether is preferably an oligomer, and preferably has a number average molecular weight (Mn) of 500 to 3500.

Examples of the monomer (B) include crosslinkable monomers and monofunctional monomers. From the standpoint that the effects of the present invention can be exhibited to a greater extent, a monomer that reacts with the terminal group of the compound (A) is preferable.

Examples of crosslinkable monomers include: multifunctional (meth)acrylates such as ethylene glycol di(meth)acrylate, polyethylene glycol di(meth)acrylate, and glycerol tri(meth)acrylate, multifunctional acrylamide derivatives such as N,N'-methylenebis(meth)acrylamide and N,N'-ethylenebis(meth)acrylamide, multifunctional allyl derivatives such as diallylamine and tetraallyloxyethane; and aromatic crosslinkable monomers such as divinylbenzene, divinylnaphthalene, and diallylphthalate. From the standpoint that the effects of the present invention can be exhibited to a greater extent, as crosslinkable monomers, aromatic crosslinkable monomers are preferable, and divinylbenzene is more preferable. Only one of the crosslinkable monomers may be used, or two or more of crosslinkable monomers may be used in combination.

Examples of monofunctional monomers include alkyl (meth)acrylates having 1 to 16 carbon atoms such as methyl (meth)acrylate, ethyl (meth)acrylate, butyl (meth)acrylate, and cetyl (meth)acrylate; aromatic monofunctional monomers such as styrene, α-methylstyrene, ethyl vinyl benzene, vinyl toluene, o-chlorostyrene, m-chlorostyrene, p-chlorostyrene, vinyl biphenyl, and vinyl naphthalene; dicarboxylic acid ester monomers such as dimethyl maleate, diethyl maleate, dimethyl fumarate, and diethyl fumarate; maleic anhydride; N-vinylcarbazole; and (meth)acrylonitrile. From the standpoint that the effects of the present invention can be exhibited to a greater extent, as monofunctional monomers, aromatic monofunctional monomer are preferable, and styrene and ethyl vinyl benzene are more preferable. Only one of the monofunctional monomers may be used, or two or more of the monofunctional monomers may be used in combination.

The polymer (P) can typically be formed by the reaction of the compound (A) and the monomer (B).

The reaction of the compound (A) and the monomer (B) can be carried out by any appropriate reaction unless the effects of the present invention are impaired. Such a reaction is preferably a suspension polymerization reaction.

When carrying out the suspension polymerization reaction, an oil phase is typically added and suspended in an aqueous phase to carry out the polymerization reaction. The aqueous phase and the oil phase may contain any appropriate solvent unless the effects of the present invention are impaired. Examples of such a solvent include aqueous media and non-reactive solvents described later. Only one of the solvents may be used, or two or more of the solvents may be used in combination.

When carrying out the reaction of the compound (A) and the monomer (B), any appropriate additive (C) which corresponds to neither the compound (A) nor the monomer (B) may be used unless the effects of the present invention are impaired. As the additive (C), only one additive may be used, or two or more additives may be used in combination. The additives here do not include solvents such as aqueous media and non-reactive solvents described later.

The content ratio of the additive (C) to the total amount of the compound (A) and the monomer (B) is preferably from 0 wt % to 40 wt %, more preferably from 0 wt % to 30 wt %, further preferably from 0 wt % to 20 wt %, and particularly preferably from 0 wt % to wt %.

As the additive (C), any appropriate additive can be adopted unless the effects of the present invention are impaired. Examples of such an additive (C) include a non-crosslinkable polymer, a dispersion stabilizer, a surfactant, and a polymerization initiator.

When a non-crosslinkable polymer is contained as the additive (C), phase separation between the solvent and the polymer (P) produced as the reaction proceeds can be promoted, so that shell formation can be promoted.

The non-crosslinkable polymer is, for example, at least one polymer selected from the group consisting of a polyolefin, a styrene-based polymer, a (meth)acrylic acid-based polymer, and a styrene-(meth)acrylic acid-based polymer.

Examples of the polyolefin include polyethylene, polypropylene, and poly-$\alpha$-olefin. From the viewpoint of solubility in a monomer composition, a side chain crystalline polyolefin using a long-chain $\alpha$-olefin as a raw material, or a low-molecular-weight polyolefin or olefin oligomer produced with a metallocene catalyst is preferably used.

Examples of the styrene-based polymer include polystyrene, a styrene-acrylonitrile copolymer, and an acrylonitrile-butadiene-styrene copolymer.

Examples of the (meth)acrylic acid-based polymer include polymethyl (meth)acrylate, polyethyl (meth)acrylate, polybutyl (meth)acrylate, and polypropyl (meth)acrylate.

Examples of the styrene-(meth)acrylic acid-based polymer include a styrene-methyl (meth)acrylate copolymer, a styrene-ethyl (meth)acrylate copolymer, a styrene-butyl (meth)acrylate copolymer, and a styrene-propyl (meth)acrylate copolymer.

<<1-3. Relative Dielectric Constant of Hollow Resin Particle>>

The relative dielectric constant of the hollow resin particle according to the embodiment of the present invention is preferably from 1.0 to 2.5, more preferably from 1.0 to 2.4, and further preferably from 1.0 to 2.3. When the relative dielectric constant of the hollow resin particle according to the embodiment of the present invention falls within the above range, the effects of the present invention can be exhibited to a greater extent. If the relative dielectric constant of the hollow resin particle according to the embodiment of the present invention is higher than 2.5, a sufficient dielectricity-reducing effect cannot be obtained even when the hollow resin particle is mixed into, for example, a thermosetting resin.

The relative dielectric constant of the hollow resin particle according to the embodiment of the present invention can be calculated with reference to, for example, "Dielectric Constant of Mixed Systems" (Oyo Buturi, Volume 27, Issue 8 (1958)). The following equation is established, where $\varepsilon$ represents the relative dielectric constant of a mixed system of a dispersion medium and the hollow resin particle, $\varepsilon_1$ represents the relative dielectric constant of a base material (e.g., a resin composition of polyimide, an epoxy, or the like) serving as the dispersion medium, $\varepsilon_2$ represents the relative dielectric constant of the hollow resin particle, and $\varphi$ represents the volume fraction of the hollow resin particle in the mixed system. That is, when $\varepsilon$, $\varepsilon_1$, and $\varphi$ are experimentally determined, the relative dielectric constant $\varepsilon_2$ of the hollow resin particle can be calculated.

$$\frac{\varepsilon - \varepsilon_1}{\varepsilon + 2\varepsilon_1} = \frac{\varepsilon_2 - \varepsilon_1}{\varepsilon_2 + 2\varepsilon_1}\varphi \qquad [\text{Math. 1}]$$

The volume fraction $\varphi$ of the hollow resin particle in the mixed system of the dispersion medium and the hollow resin particle can be determined as follows.

$$\varphi = \frac{\dfrac{\text{Weight of hollow resin particle in mixed system (g)}}{\text{Density of hollow resin particle (g/cm}^3)}}{\dfrac{\text{Weight of hollow resin particle in mixed system (g)}}{\text{Density of hollow resin particle (g/cm}^3)} + \dfrac{\text{Weight of base material in mixed system (g)}}{\text{Density of base material (g/cm}^3)}} \qquad [\text{Math. 2}]$$

The density of the hollow resin particle can be experimentally determined using a pycnometer (TQC 50 mL pycnometer, manufactured by COTEC Corporation,) and trade name "ARUFON (trademark) UP-1080" (Toagosei Co., Ltd., density: 1.05 g/cm$^3$) which is a liquid polymer. Specifically, the hollow resin particle and ARUFON UP-1080 are defoamed and stirred using a planetary stirring defoamer ("Mazerustar KK-250", manufactured by Kurabo Industries Ltd.) such that the ratio of the hollow resin particle is 10 wt %, to produce a mixture for evaluation. The mixture for evaluation is loaded into the pycnometer having a capacity of 50 mL, and the weight of the loaded mixture for evaluation is calculated by subtracting the weight of the pycnometer in an empty state from the weight of the pycnometer filled with the mixture. From the resultant value, the density of the hollow resin particle can be calculated using the following equation.

$$\text{Density of hollow resin particle (g/cm}^3) = \frac{\text{Weight of mixture for evaluation (g)} \times 0.1}{50(\text{cm}^3) - \dfrac{\text{Weight of mixture for evaluation (g)} \times .09}{\text{Density of } UP\text{-}1080(g/cm}^3)} \qquad [\text{Math. 3}]$$

<<1-4. Applications of Hollow Resin Particle>>

The hollow resin particle according to the embodiment of the present invention can be adopted for various applications. The hollow resin particle according to the embodiment of the present invention is suitable for semiconductor components from the standpoint that the effects of the present invention can be further utilized, and is typically suitable for use for resin compositions for a semiconductor component. In addition to the above application to resin compositions for a semiconductor component, the hollow resin particle according to the embodiment of the present invention can also be applied to paint compositions, cosmetic materials, paper coating compositions, heat-insulating compositions, light-diffusible compositions, light-diffusing films, etc.

<Resin Composition for Semiconductor Component>

The hollow resin particle according to the embodiment of the present invention can achieve reductions in dielectricity and dielectric loss tangent, can exhibit excellent heat resistance, and thus is suitable for use for a resin composition for a semiconductor component.

A resin composition for a semiconductor component according to an embodiment of the present invention contains the hollow resin particle according to the embodiment of the present invention.

The semiconductor component means a member that forms a semiconductor, and examples of the semiconductor component include semiconductor packages and semiconductor modules. As used herein, the resin composition for a semiconductor component means a resin composition to be used for a semiconductor component.

A semiconductor package is a package formed using at least one member selected from among a mold resin, an underfill material, a mold underfill material, a die bond material, a prepreg for a semiconductor package substrate, a metal clad laminated plate for a semiconductor package substrate, and a build-up material for a printed circuit board for a semiconductor package, with an IC chip as an essential component.

A semiconductor module is a module formed using at least one member selected from among a prepreg for a printed circuit board, a metal clad laminated plate for a printed circuit board, a build-up material for a printed circuit board, a solder resist material, a coverlay film, an electromagnetic wave shielding film, and an adhesive sheet for a printed circuit board, with a semiconductor package as an essential component.

<Paint Composition>

The hollow resin particle according to the embodiment of the present invention is suitable for use for a paint composition, since excellent appearance can be imparted to a paint film containing the hollow resin particle.

A paint composition according to an embodiment of the present invention contains the hollow resin particle according to the embodiment of the present invention.

The paint composition according to the embodiment of the present invention preferably contains at least one resin selected from a binder resin and a UV curable resin. Only one binder resin may be used, or two or more binder resins may be used in combination. Only one UV curable resin may be used, or two or more UV curable resins may be used in combination.

As the binder resin, any appropriate binder resin can be adopted unless the effects of the present invention are impaired. Examples of such a binder resin include resins that are soluble in organic solvents or water, and emulsion-type aqueous resins that can be dispersed in water. Specific examples of the binder resin include acrylic resins, alkyd resins, polyester resins, polyurethane resins, chlorinated polyolefin resins, and amorphous polyolefin resins.

As the UV curable resin, any appropriate UV curable resin can be adopted unless the effects of the present invention are impaired. Examples of such a UV curable resin include multifunctional (meth)acrylate resins and multifunctional urethane acrylate resins, multifunctional (meth)acrylate resins are preferable, and a multifunctional (meth)acrylate resin having three or more (meth)acryloyl groups in one molecule is more preferable. Specific examples of the multifunctional (meth)acrylate resin having three or more (meth)acryloyl groups in one molecule include trimethylolpropane tri(meth) acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth) acrylate, dipentaerythritol triacrylate, dipentaerythritol pentaacrylate, dipentaerythritol tetra(meth)acrylate, dipentaerythritol hexa(meth)acrylate, tripentaerythritol triacrylate, and tripentaerythritol hexaacrylate.

In the case where the paint composition according to the embodiment of the present invention contains at least one resin selected from a binder resin and a UV curable resin, any appropriate content ratio can be adopted as the content ratio of the resin, depending on the purpose. Typically, the amount of the hollow resin particle according to the embodiment of the present invention per the total amount of the hollow resin particle according to the embodiment of the present invention and at least one resin selected from a binder resin (in terms of solid content in the case of an emulsion-type aqueous resin) and a UV curable resin, is preferably from 5 wt % to 50 wt %, more preferably from 10 wt % to 50 wt %, and further preferably from 20 wt % to 40 wt %.

In the case where a UV curable resin is used, a photoinitiator is preferably used in combination. As the photoinitiator, any appropriate photoinitiator can be adopted unless the effects of the present invention are impaired. Examples of such a photoinitiator include acetophenones, benzoins, benzophenones, phosphine oxides, ketals, $\alpha$-hydroxyalkylphenones, $\alpha$-aminoalkylphenones, anthraquinones, thioxanthones, azo compounds, peroxides (as described in JP 2001-139663 A, etc.), 2,3-dialkyl dione compounds, disulfide compounds, fluoroamine compounds, aromatic sulfonium compounds, onium salts, borate salts, active halogen compounds, and $\alpha$-acyl oxime esters.

The paint composition according to the embodiment of the present invention may contain a solvent. Only one solvent may be used, or two or more solvents may be used in combination. In the case where the paint composition according to the embodiment of the present invention contains a solvent, any appropriate content ratio can be adopted as the content ratio of the solvent, depending on the purpose.

As the solvent, any appropriate solvent can be adopted unless the effects of the present invention are impaired. Such a solvent is preferably a solvent in which a binder resin or a UV curable resin can be dissolved or dispersed. For an oil-based paint, examples of such a solvent include: hydrocarbon-based solvents such as toluene and xylene; ketone-based solvents such as methyl ethyl ketone and methyl isobutyl ketone; ester-based solvents such as ethyl acetate and butyl acetate; and ether-based solvents such as dioxane, ethylene glycol diethyl ether, and ethylene glycol monobutyl ether. For a water-based paint, examples of such a solvent include water and alcohols.

The paint composition according to the embodiment of the present invention may be diluted in order to adjust the viscosity thereof if necessary. As a diluent, any appropriate diluent can be adopted depending on the purpose. Examples of such a diluent include the above-described solvents. Only one of the diluents may be used, or two or more of the diluents may be used in combination.

The paint composition according to the embodiment of the present invention may contain other components, such as a coating surface modifier, a fluidity modifier, a UV absorber, a light stabilizer, a curing catalyst, a body pigment, a coloring pigment, a metal pigment, a mica powder pigment, and a dye, if necessary.

In the case where the paint composition according to the embodiment of the present invention is used to form a paint film, as a coating method therefor, any appropriate coating method can be adopted depending on the purpose. Examples of such a coating method include a spray coating method, a roll coating method, a brush coating method, a reverse roll coating method, a gravure coating method, a die coating method, and a comma coating method.

In the case where the paint composition according to the embodiment of the present invention is used to form a paint film, as a formation method therefor, any appropriate formation method can be adopted depending on the purpose. An example of such a formation method is a method in which a paint film is formed by coating any coating surface of a base material to create a coating film, drying the coating film, and then curing the coating film if necessary. Examples of the base material include metal, wood, glass, and plastics (PET (polyethylene terephthalate), PC (polycarbonate), acrylic resin, TAC (triacetyl cellulose), etc.).

<Heat-Insulating Resin Composition>

The hollow resin particle according to the embodiment of the present invention is suitable for use for a heat-insulating resin composition, since excellent heat-insulating properties can be imparted to a paint film containing the hollow resin particle. The paint film containing the hollow resin particle according to the embodiment of the present invention can exhibit an excellent reflectance in a wavelength range from ultraviolet light to near-infrared light.

A heat-insulating resin composition according to an embodiment of the present invention contains the hollow resin particle according to the embodiment of the present invention.

The heat-insulating resin composition according to the embodiment of the present invention preferably contains at least one resin selected from a binder resin and a UV curable resin. For the binder resin and the UV curable resin, the foregoing description of the paint composition may be applied.

The heat-insulating resin composition according to the embodiment of the present invention may contain a solvent. For the solvent, the foregoing description of the paint composition may be applied.

The heat-insulating resin composition according to the embodiment of the present invention may be diluted in order to adjust the viscosity thereof if necessary. For the diluent, the foregoing description of the paint composition may be applied.

The heat-insulating resin composition according to the embodiment of the present invention may contain other components, such as a coating surface modifier, a fluidity modifier, a UV absorber, a light stabilizer, a curing catalyst, a body pigment, a coloring pigment, a metal pigment, a mica powder pigment, and a dye, if necessary.

For a coating method and a formation method in the case where the heat-insulating resin composition according to the embodiment of the present invention is used to form a paint film, the foregoing description of the paint composition may be applied.

<Light-Diffusible Resin Composition>

The hollow resin particle according to the embodiment of the present invention is suitable for use for a light-diffusible resin composition, since excellent light-diffusing properties can be imparted to a paint film containing the hollow resin particle.

A light-diffusible resin composition according to an embodiment of the present invention contains the hollow resin particle according to the embodiment of the present invention.

The light-diffusible resin composition according to the embodiment of the present invention preferably contains at least one resin selected from a binder resin and a UV curable resin. For the binder resin and the UV curable resin, the foregoing description of the paint composition may be applied.

The light-diffusible resin composition according to the embodiment of the present invention may contain a solvent. For the solvent, the foregoing description of the paint composition may be applied.

The light-diffusible resin composition according to the embodiment of the present invention may be diluted in order to adjust the viscosity thereof if necessary. For the diluent, the foregoing description of the paint composition may be applied.

The light-diffusible resin composition according to the embodiment of the present invention may contain other components, such as a coating surface modifier, a fluidity modifier, a UV absorber, a light stabilizer, a curing catalyst, a body pigment, a coloring pigment, a metal pigment, a mica powder pigment, and a dye, if necessary.

For a coating method and a formation method in the case where the light-diffusible resin composition according to the embodiment of the present invention is used to form a paint film, the foregoing description of the paint composition may be applied.

<Light-Diffusing Film>

The hollow resin particle according to the embodiment of the present invention is also suitable for use for a light-diffusing film, since excellent light-diffusing properties can be imparted to a film including a paint film containing the hollow resin particle.

A light-diffusing film according to an embodiment of the present invention contains the hollow resin particle according to the embodiment of the present invention.

The light-diffusing film according to the embodiment of the present invention includes a light-diffusing layer formed from the light-diffusible resin composition according to the embodiment of the present invention, and a base material. The light-diffusing layer may or may not be the outermost layer of the light-diffusing film. The light-diffusing film according to the embodiment of the present invention may include any appropriate other layers, depending on the purpose. Examples of such other layers include a protective layer, a hard coat layer, a planarization layer, a high refractive index layer, an insulating layer, a conductive resin layer, a conductive metal fine particle layer, a conductive metal oxide fine particle layer, and a primer layer.

Examples of the base material include metal, wood, glass, a plastic film, a plastic sheet, a plastic lens, a plastic panel, a cathode ray tube, a fluorescent display tube, and a liquid crystal display panel. Examples of plastics forming the plastic film, the plastic sheet, the plastic lens, and the plastic panel include PET (polyethylene terephthalate), PC (polycarbonate), acrylic resin, and TAC (triacetyl cellulose).

<<<<2. Method for Producing Hollow Resin Particle>>>>

A method for producing the hollow resin particle according to the embodiment of the present invention includes reacting 20 parts by weight to 80 parts by weight of a compound (A) having an ether structure represented by formula (1) and 20 parts by weight to 80 parts by weight of a monomer (B) which reacts with the compound (A) (the total amount of the compound (A) and the monomer (B) is 100 parts by weight), in an aqueous medium in the presence of a non-reactive solvent.

[Chem. 4]

(1)

With the above production method, the hollow resin particle according to the embodiment of the present invention can be produced in a simple manner.

The hollow resin particle according to the embodiment of the present invention can be obtained by reacting the compound (A) and the monomer (B) in the aqueous medium in the presence of the non-reactive solvent. Typically, the hollow resin particle according to the embodiment of the present invention can be produced by subjecting the compound (A) and the monomer (B) to a suspension polymerization reaction.

The suspension polymerization is typically suspension polymerization in which an aqueous phase containing the aqueous medium and an oil phase containing the compound (A), the monomer (B), and the non-reactive solvent are used, and, preferably, the suspension polymerization is performed by adding and dispersing the oil phase containing the compound (A), the monomer (B), and the non-reactive solvent in the aqueous phase containing the aqueous medium, and performing heating.

For the dispersion, any appropriate dispersion method can be adopted unless the effects of the present invention are impaired, as long as the oil phase can be made to exist in droplet form in the aqueous phase. Such a dispersion method is typically a dispersion method using a homomixer or a homogenizer, and examples of the homogenizer include a polytron homogenizer, an ultrasonic homogenizer, and a high-pressure homogenizer.

As a polymerization temperature, any appropriate polymerization temperature can be adopted unless the effects of the present invention are impaired, as long as the temperature is suitable for the suspension polymerization. Such a polymerization temperature is preferably from 30° C. to 80° C.

As a polymerization time, any appropriate polymerization time can be adopted unless the effects of the present invention are impaired, as long as the time is suitable for the suspension polymerization. Such a polymerization time is preferably from 1 hour to 48 hours.

Post-heating to be preferably performed after the polymerization is a treatment suitable for obtaining a hollow resin particle with high perfection.

As the temperature of the post-heating to be preferably performed after the polymerization, any appropriate temperature can be adopted unless the effects of the present invention are impaired. Such a temperature of the post-heating is preferably from 70° C. to 120° C.

As the time of the post-heating to be preferably performed after the polymerization, any appropriate time can be adopted unless the effects of the present invention are impaired. Such a time of the post-heating is preferably from 1 hour to 24 hours.

For the compound (A) and the monomer (B), the description in the section <Polymer (P)> in <<1-2. Shell Portion>> in <<<<1. Hollow Resin Particle>>>> may be applied as it is.

For the content ratio between the compound (A) and the monomer (B), the description in the section <Polymer (P)> in <<1-2. Shell Portion>> in <<<<1. Hollow Resin Particle>>>> may be applied as it is.

Examples of the aqueous medium include water and a mixed medium of water and a lower alcohol (e.g., methanol, ethanol, or the like).

As the use amount of the aqueous medium, any appropriate amount can be adopted unless the effects of the present invention are impaired. Such a use amount of the aqueous medium is typically an amount that allows the suspension polymerization reaction, in which the oil phase is added and suspended in the aqueous phase, to proceed appropriately, and the use amount of the aqueous medium per 100 parts by weight of the total amount of the compound (A), the monomer (B), and the non-reactive solvent is preferably from 100 parts by weight to 5000 parts by weight, and more preferably from 150 parts by weight to 2000 parts by weight.

The non-reactive solvent is a solvent that does not chemically react with each of the compound (A) having an ether structure represented by formula (1) and the monomer (B) which reacts with the compound (A), and is preferably an organic solvent. The non-reactive solvent typically acts as a hollowing agent to give airspace to the particle. Examples of the non-reactive solvent include heptane, hexane, toluene, cyclohexane, methyl acetate, ethyl acetate, methyl ethyl ketone, chloroform, and carbon tetrachloride. From the standpoint of easily removing the non-reactive solvent from the hollow resin particle, the boiling point of the non-reactive solvent is preferably lower than 100° C.

The non-reactive solvent serving as a hollowing agent may be a single solvent or may be a mixed solvent.

The addition amount of the non-reactive solvent per 100 parts by weight of the total amount of the compound (A) and the monomer (B) is preferably from 20 parts by weight to 250 parts by weight.

When carrying out the reaction of the compound (A) and the monomer (B), any appropriate additive (C) which corresponds to neither the compound (A) nor the monomer (B) may be used unless the effects of the present invention are impaired. As the additive (C), only one additive may be used, or two or more additives may be used in combination. The additives here do not include solvents such as aqueous media and non-reactive solvents.

The content ratio of the additive (C) to the total amount of the compound (A) and the monomer (B) is preferably from 0 wt % to 40 wt %, more preferably from 0 wt % to 30 wt %, further preferably from 0 wt % to 20 wt %, and particularly preferably from 0 wt % to wt %.

As the additive (C), any appropriate additive can be adopted unless the effects of the present invention are impaired. Examples of such an additive (C) include a non-crosslinkable polymer, a dispersion stabilizer, a surfactant, and a polymerization initiator.

For the non-crosslinkable polymer, the description in the section <Polymer (P)> in <<1-2. Shell Portion>> in <<<<1. Hollow Resin Particle>>>> may be applied as it is.

Examples of the dispersion stabilizer include polyvinyl alcohol, polycarboxylic acids, celluloses (e.g., hydroxyethyl cellulose, carboxymethyl cellulose, etc.), and polyvinylpyrrolidone. In addition, inorganic water-soluble high-molecular-weight compounds such as sodium tripolyphosphate can also be used. Furthermore, phosphates such as calcium phosphate, magnesium phosphate, aluminum phosphate, and zinc phosphate; pyrophosphates such as calcium pyrophosphate, magnesium pyrophosphate, aluminum pyrophosphate, and zinc pyrophosphate; poorly water-soluble inorganic compounds such as calcium carbonate, magnesium carbonate, calcium hydroxide, magnesium hydroxide, aluminum hydroxide, calcium metasilicate, calcium sulfate, barium sulfate, and colloidal silica; etc., can also be used. Magnesium pyrophosphate is preferably used, since removal of magnesium pyrophosphate from the hollow resin particle is relatively easy and magnesium pyrophosphate is less likely to remain on the surface of the hollow resin particle.

The addition amount of the dispersion stabilizer per 100 parts by weight of the aqueous medium is preferably from 0.5 parts by weight to 10 parts by weight. Only one of the dispersion stabilizers may be used, or two or more of the dispersion stabilizers may be used in combination.

Examples of the surfactant include anionic surfactants, cationic surfactants, amphoteric surfactants, and nonionic surfactants.

Examples of the anionic surfactants include: non-reactive anionic surfactants such as alkyl sulfates, alkyl phosphates, alkyl benzene sulfonates, alkyl naphthalene sulfonates, alkane sulfonates, alkyl diphenyl ether sulfonates, dialkyl sulfosuccinates, monoalkyl sulfosuccinates, and polyoxyethylene alkyl phenyl ether phosphates; and reactive anionic surfactants such as polyoxyethylene-1-(allyloxymethyl) alkyl ether sulfate ammonium salts, polyoxyethylene alkyl propenyl phenyl ether sulfate ester ammonium salts, and polyoxyalkylene alkenyl ether ammonium sulfates. The surfactant is not limited to the salt structure, and, for example, alkyl sulfate esters and alkyl phosphate esters can also be used. Specific examples thereof include lauryl sulfate and lauryl phosphate.

Examples of the cationic surfactants include cationic surfactants such as alkyltrimethylammonium salts, alkyltriethylammonium salts, dialkyldimethylammonium salts, dialkyldiethylammonium salts, and N-polyoxyalkylene-N,N,N-trialkylammonium salts.

Examples of the amphoteric surfactants include lauryldimethylamine oxide, phosphates, and phosphite-based surfactants.

Examples of the nonionic surfactants include polyoxyethylene alkyl ethers, polyoxyethylene alkyl phenyl ethers, polyoxyethylene fatty acid esters, sorbitan fatty acid esters, polysorbitan fatty acid esters, polyoxyethylene alkylamines, glycerol fatty acid esters, and oxyethylene-oxypropylene block polymers.

The addition amount of the surfactant per the total amount of the compound (A), the monomer (B), and the non-reactive solvent is preferably from 0.01 wt % to 5 wt %. Only one of the surfactants may be used, or two or more of the surfactants may be used in combination.

As the polymerization initiator, any appropriate polymerization initiator can be adopted unless the effects of the present invention are impaired. Examples of such a polymerization initiator include: organic peroxides such as lauroyl peroxide, benzoyl peroxide, orthochlorobenzoyl peroxide, orthomethoxybenzoyl peroxide, 3,5,5-trimethylhexanoyl peroxide, t-butyl peroxy-2-ethylhexanoate, and di-t-butyl peroxide; and azo-based compounds such as 2,2'-azobisisobutyronitrile, 1,1'-azobiscyclohexanecarbonitrile, and 2,2'-azobis(2,4-dimethylvaleronitrile).

The content ratio of the polymerization initiator to the total amount of the compound (A) and the monomer (B) is preferably from 0.1 wt % to 5 wt %. Only one of the polymerization initiators may be used, or two or more of the polymerization initiators may be used in combination.

EXAMPLES

The present invention will be specifically described below by way of Examples, but the present invention is not limited to these Examples. "Part(s)" means "part(s) by weight" and "%" means "wt %" unless otherwise specified.

Measurement of Volume Average Particle Diameter (Examples 1 to 7, Example and Comparative Example 1)

The volume average particle diameter of particles was measured by the Coulter method as follows.

The volume average particle diameter of the particles was measured by Coulter Multisizer (registered trademark) 3 (measurement apparatus manufactured by Beckman Coulter, Inc.). The measurement was performed using an aperture calibrated according to the Multisizer (registered trademark) 3 user's manual published by Beckman Coulter, Inc. The aperture to be used in the measurement was selected as appropriate according to the size of the particles to be measured, for example, an aperture having a size of 50 μm was selected when the assumed volume average particle diameter of the particles to be measured was not smaller than 1 μm and not larger than 10 μm, an aperture having a size of 100 μm was selected when the assumed volume average particle diameter of the particles to be measured was larger than 10 μm and not larger than 30 μm, an aperture having a size of 280 μm was selected when the assumed volume average particle diameter of the particles was larger than 30 μm and not larger than 90 μm, and an aperture having a size of 400 μm was selected when the assumed volume average particle diameter of the particles was larger 90 μm and not larger than 150 μm. If the measured volume average particle diameter was different from the assumed volume average particle diameter, the aperture was changed to an aperture having an appropriate size, and the measurement was performed again. Current (aperture current) and Gain were set as appropriate according to the selected aperture size. For example, when the aperture having a size of 50 μm was selected, Current (aperture current) was set to −800, and Gain was set to 4. When the aperture having a size of 100 μm was selected, Current (aperture current) was set to −1600, and Gain was set to 2. When the apertures having sizes of 280 μm and 400 μm were selected, Current (aperture current) was set to −3200, and Gain was set to 1.

As a sample for measurement, a dispersion liquid obtained by dispersing 0.1 g of the particles in 10 ml of a 0.1 wt % nonionic surfactant aqueous solution using a touch mixer ("TOUCH MIXER MT-31", manufactured by Yamato Scientific Co., Ltd.) and an ultrasonic cleaner ("ULTRASONIC CLEANER VS-150", manufactured by VELVO-CLEAR) was used. During the measurement, the interior of a beaker was stirred gently enough to prevent air bubbles from being formed, and the measurement was terminated when 100,000 particles were measured. The volume average particle diameter of the particles was defined as the arithmetic mean in a volume-based particle size distribution of the 100,000 particles.

Measurement of Average Particle Diameter (Examples 8 and 9, and Comparative Example 2)

The Z-average particle diameter of hollow resin particles or particles was measured by utilizing a dynamic light scattering method, and the measured Z-average particle diameter was defined as the average particle diameter of the obtained hollow resin particles or particles.

That is, first, the obtained hollow resin particles or particles in the form of a slurry were diluted with ion-exchanged water and adjusted to 0.1 wt %, the resultant water dispersion was irradiated with laser light, and the intensity of scattered light scattered from the hollow resin particles or the particles was measured with time change in microseconds. Then, the detected scattering intensity distribution derived from the hollow resin particles or the particles was fitted to a normal distribution, and the Z-average particle diameter of the hollow resin particles or the particles was determined by a cumulant analysis method for calculating an average particle diameter.

The measurement of the Z-average particle diameter can be simply performed with a commercially available particle diameter measurement apparatus. In each of the following Examples and Comparative Example, the Z-average particle diameter was measured using a particle diameter measurement apparatus ("Zetasizer Nano ZS", manufactured by Malvern Panalytical). In general, a commercially available particle diameter measurement apparatus has data analysis software installed thereon, and is capable of calculating a Z-average particle diameter by automatically analyzing measurement data with the data analysis software.

<Cross-Section Observation>

Dried particles were mixed with photo-curable resin D-800 (manufactured by JEOL Ltd.) and irradiated with ultraviolet light to obtain a cured material. Then, the cured material was cut with nippers, the cross-sectional portion thereof was processed to be smooth using a cutter, and the sample was coated using an "Auto Fine Coater JFC-1300" sputtering apparatus manufactured by JEOL Ltd. Then, the cross section of the sample was photographed using the secondary electron detector of a "SU1510" scanning electron microscope manufactured by Hitachi High-Technologies Corporation.

<TEM Measurement: Observation of Presence or Absence of Hollow and Shape of Hollow Resin Particles or Particles>

Hollow resin particles or particles as dry powder were subjected to surface treatment (10 Pa, 5 mA, 10 seconds) using an "Osmium Coater Neoc-Pro" coating apparatus manufactured by Meiwafosis Co., Ltd. Then, the hollow resin particles or the particles were observed with a transmission electron microscope (TEM, "H-7600", manufactured by Hitachi High-Technologies Corporation) to determine the presence or absence of a hollow and the shape of the hollow resin particles or the particles. At this time, an image was taken at an acceleration voltage of 80 kV and a magnification of times or 10,000 times.

<Measurement of 5% Thermal Weight Loss Temperature When Temperature was Increased at Rate of 10° C./min in Nitrogen Atmosphere>

A 5% thermal weight loss temperature was measured using a "TG/DTA6200, AST-2" differential thermogravimetric simultaneous measurement apparatus manufactured by SII NanoTechnology Inc. The sampling method and temperature conditions were as follows.

On the bottom of a platinum measurement container, 10.5±0.5 mg of a sample was placed without any gaps to prepare a sample for measurement. The 5% thermal weight loss temperature was measured with alumina as a reference material under a nitrogen gas flow rate of 230 mL/min. A TG/DTA curve was obtained by heating the sample from 30° C. to 500° C. at a temperature increasing rate of 10° C./min. From the obtained curve, the temperature at 5% weight loss was calculated using analysis software included in the apparatus, and was used as a 5% thermal weight loss temperature.

Example 1

2.5 g of a bifunctional polyphenylene ether oligomer (trade name "OPE-2St 1200", manufactured by MITSUBI- SHI GAS CHEMICAL COMPANY, INC.) as a compound having an ether structure represented by formula (1), 2.5 g of divinylbenzene (DVB) 810 (81%-content product, manufactured by NIPPON STEEL Chemical & Material Co., Ltd., 19% is ethyl vinyl benzene (EVB)), 5.0 g of heptane, 0.05 g of 2,2'-azobis(2,4-dimethylvaleronitrile) (trade name "V-65", manufactured by FUJIFILM Wako Pure Chemical Corporation) as a polymerization initiator, and 0.004 g of lauryl phosphate were mixed to produce an oil phase.

The oil phase was added to 32 g of a 2 wt % magnesium pyrophosphate water dispersion liquid as an aqueous phase, and a suspension was prepared using a polytron homogenizer "PT10-35" (manufactured by Central Scientific Commerce, Inc.). The obtained suspension was reacted by heating at 50° C. for 24 hours. Hydrochloric acid was added to the obtained slurry to decompose magnesium pyrophosphate, and the solids were then separated by dehydration through filtration, purified by repeated washing with water, and dried at 60° C. to obtain particles (1).

Figure 2:
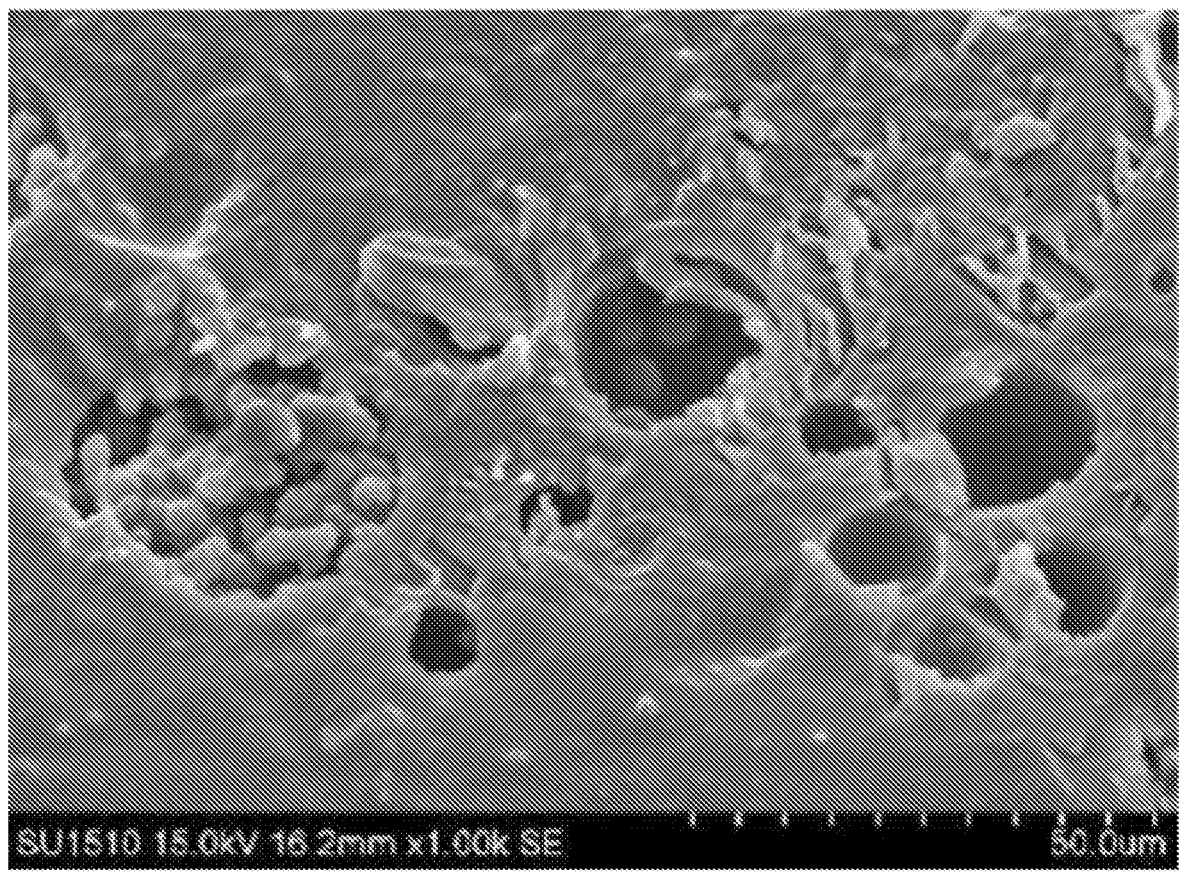
FIG. 2 is a cross-sectional photograph of hollow resin particles (1) obtained in Example 1.

A cross-sectional photograph of the obtained particles (1) is shown in FIG. 2. The obtained particles (1) were confirmed to be a mixture of hollow resin particles in each of which a hollow surrounded by a shell was composed of one hollow region and hollow resin particles in each of which a hollow surrounded by a shell was composed of a porous structure.

The average particle diameter of the obtained particles (1) was 16.3 μm.

The 5% thermal weight loss temperature of the obtained particles (1) when the temperature was increased at a rate of 10° C./min in a nitrogen atmosphere was 306° C.

Blending amounts, etc., are shown in Table 1.

Example 2

Particles (2) were obtained by performing the same operation as in Example 1, except that the amount of the bifunctional polyphenylene ether oligomer (trade name "OPE-2St 1200", manufactured by MITSUBISHI GAS CHEMICAL COMPANY, INC.) as a compound having an ether structure represented by formula (1) was set to 3.0 g, and the amount of divinylbenzene (DVB) 810 (81%-content product, manufactured by NIPPON STEEL Chemical & Material Co., Ltd., 19% is ethyl vinyl benzene (EVB)) was set to 2.0 g.

Figure 3:
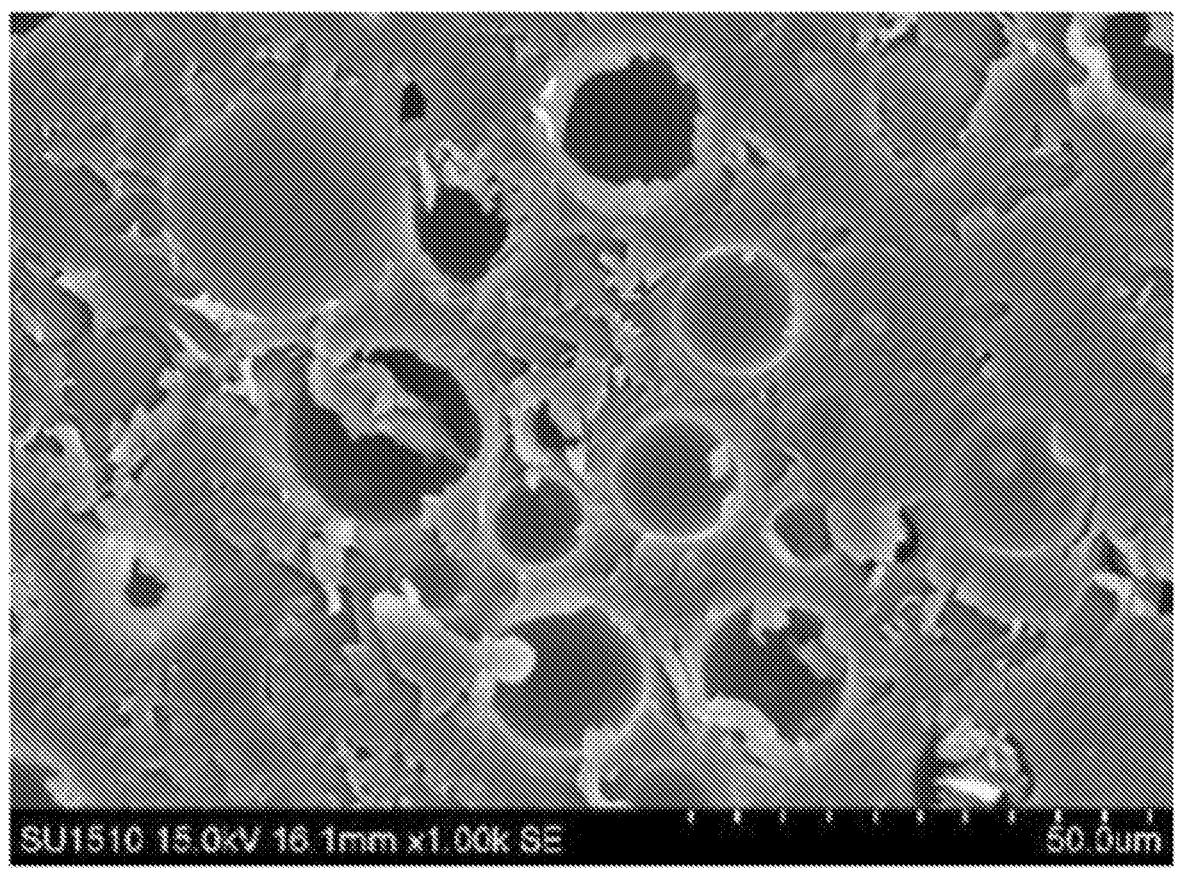
FIG. 3 is a cross-sectional photograph of hollow resin particles (2) obtained in Example 2.

A cross-sectional photograph of the obtained particles (2) is shown in FIG. 3. The obtained particles (2) were confirmed to be hollow resin particles in each of which a hollow surrounded by a shell was composed of one hollow region.

The average particle diameter of the obtained particles (2) was 15.2 μm.

The 5% thermal weight loss temperature of the obtained particles (2) when the temperature was increased at a rate of 10° C./min in a nitrogen atmosphere was 320° C.

Blending amounts, etc., are shown in Table 1.

Example 3

Particles (3) were obtained by performing the same operation as in Example 1, except that the amount of the bifunctional polyphenylene ether oligomer (trade name "OPE-2St 1200", manufactured by MITSUBISHI GAS CHEMICAL COMPANY, INC.) as a compound having an ether structure represented by formula (1) was set to 3.5 g, and the amount of divinylbenzene (DVB) 810 (81%-content product, manufactured by NIPPON STEEL Chemical & Material Co., Ltd., 19% is ethyl vinyl benzene (EVB)) was set to 1.5 g.

Figure 4:
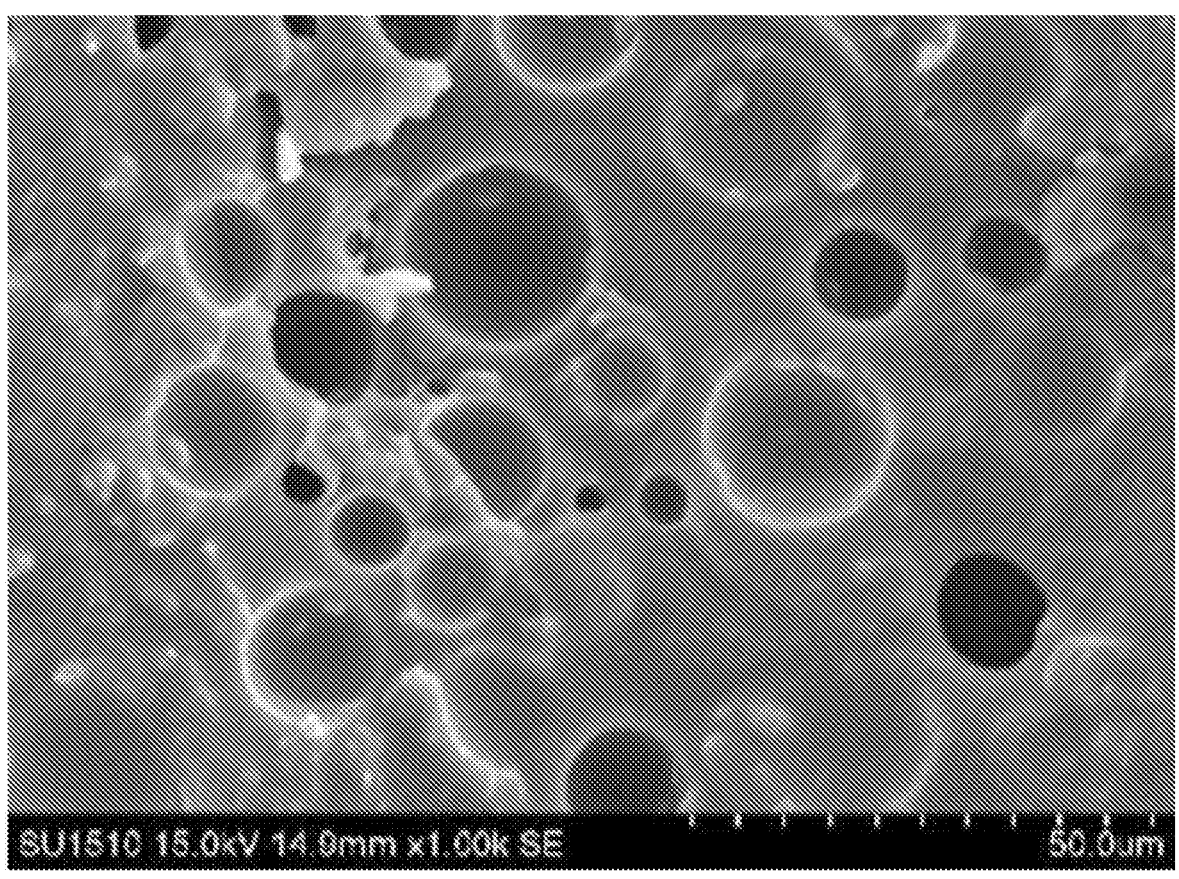
FIG. 4 is a cross-sectional photograph of hollow resin particles (3) obtained in Example 3.

A cross-sectional photograph of the obtained particles (3) is shown in FIG. 4. The obtained particles (3) were confirmed to be hollow resin particles in each of which a hollow surrounded by a shell was composed of one hollow region.

The average particle diameter of the obtained particles (3) was 13.9 μm.

The 5% thermal weight loss temperature of the obtained particles (3) when the temperature was increased at a rate of 10° C./min in a nitrogen atmosphere was 309° C.

Blending amounts, etc., are shown in Table 1.

Example 4

Particles (4) were obtained by performing the same operation as in Example 1, except that 2.5 g of a reactive low-molecular-weight polyphenylene ether (trade name "Noryl (registered trademark) SA9000-111 Resin", manufactured by SABIC INNOVATIVE PLASTICS IP B.V.) as a compound having an ether structure represented by formula (1) was used instead of 2.5 g of the bifunctional polyphenylene ether oligomer (trade name "OPE-2St 1200" as a compound having an ether structure represented by formula (1), manufactured by MITSUBISHI GAS CHEMICAL COMPANY, INC.).

Figure 5:
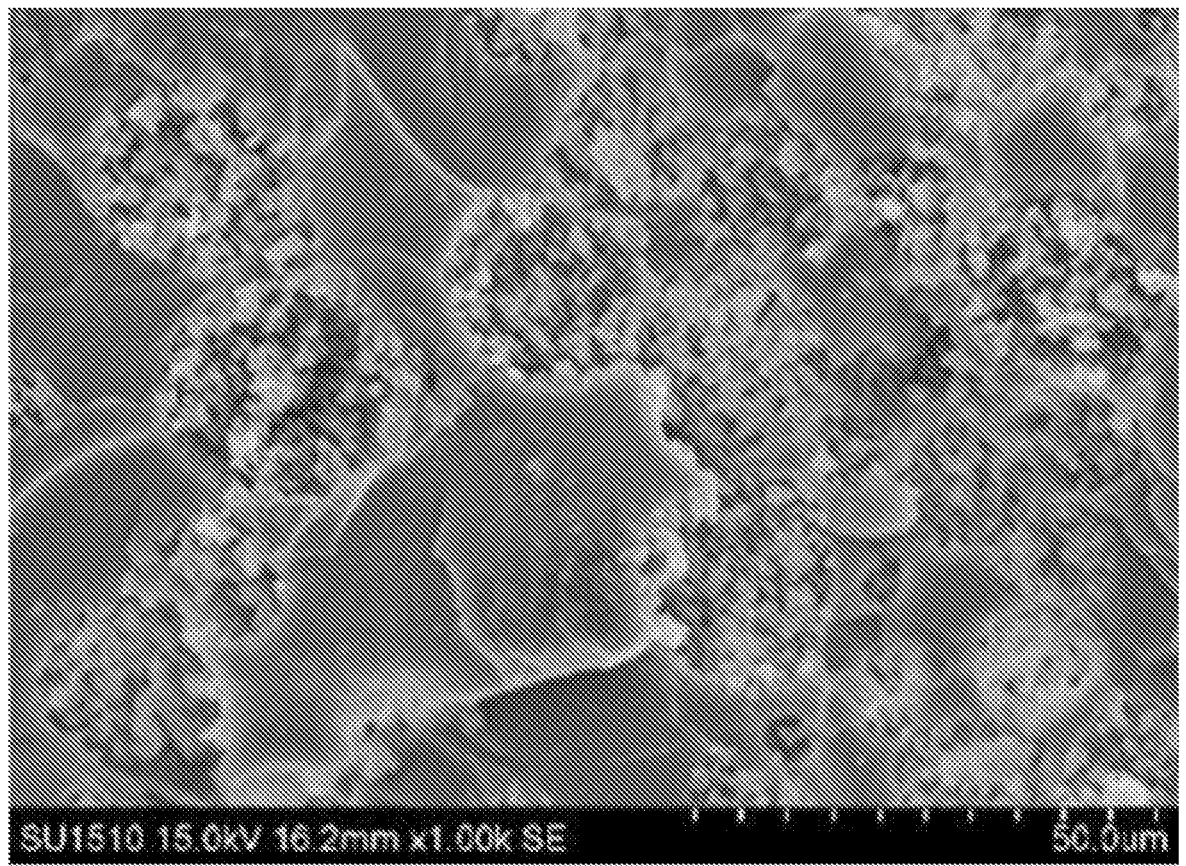
FIG. 5 is a cross-sectional photograph of hollow resin particles (4) obtained in Example 4.

A cross-sectional photograph of the obtained particles (4) is shown in FIG. 5. The obtained particles (4) were confirmed to be hollow resin particles in each of which a hollow surrounded by a shell was composed of a porous structure.

The average particle diameter of the obtained particles (4) was 16.5 μm.

The 5% thermal weight loss temperature of the obtained particles (4) when the temperature was increased at a rate of 10° C./min in a nitrogen atmosphere was 373° C.

Blending amounts, etc., are shown in Table 1.

Example 5

Particles (5) were obtained by performing the same operation as in Example 2, except that 3.0 g of a reactive low-molecular-weight polyphenylene ether (trade name "Noryl (registered trademark) SA9000-111 Resin", manufactured by SABIC INNOVATIVE PLASTICS IP B.V.) as a compound having an ether structure represented by formula (1) was used instead of 3.0 g of the bifunctional polyphenylene ether oligomer (trade name "OPE-2St 1200" as a compound having an ether structure represented by formula (1), manufactured by MITSUBISHI GAS CHEMICAL COMPANY, INC.).

Figure 6:
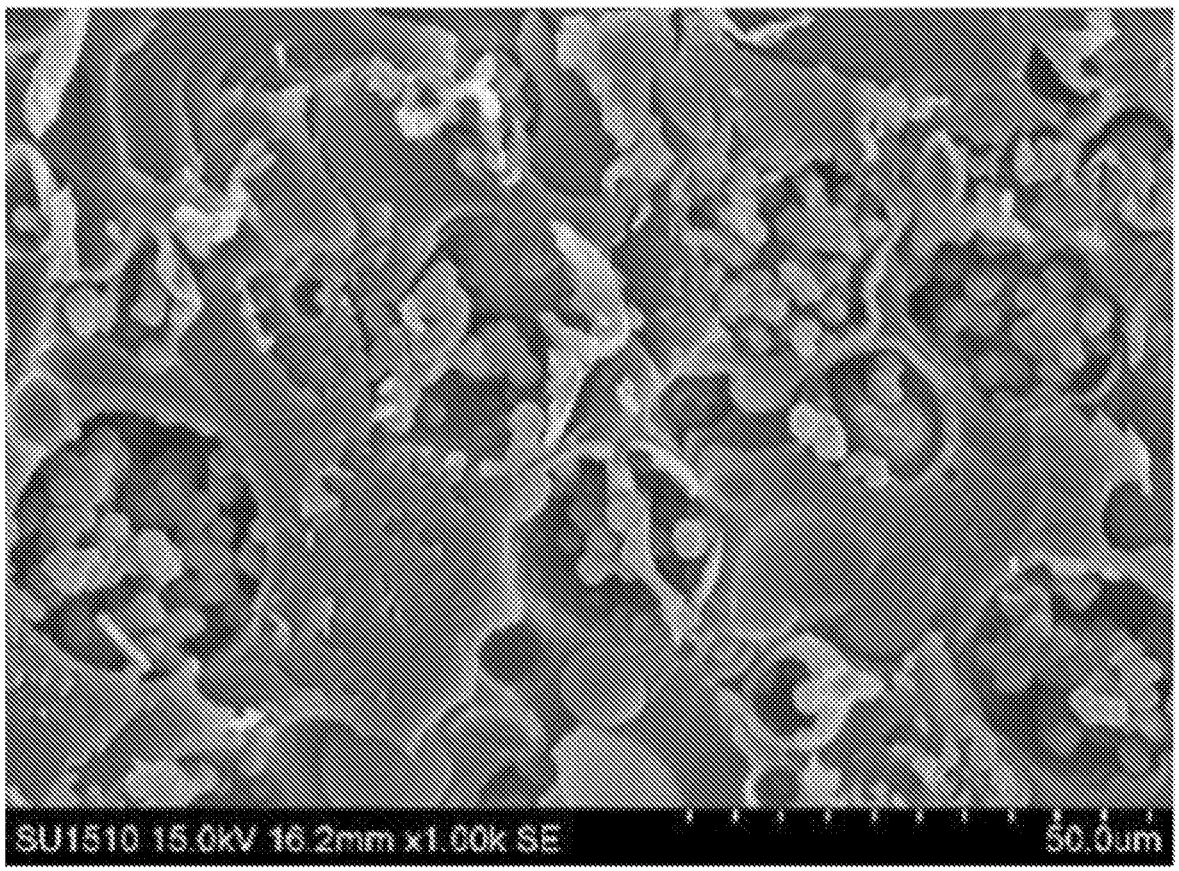
FIG. 6 is a cross-sectional photograph of hollow resin particles (5) obtained in Example 5.

A cross-sectional photograph of the obtained particles (5) is shown in FIG. 6. The obtained particles (5) were confirmed to be hollow resin particles in each of which a hollow surrounded by a shell was composed of a porous structure.

The average particle diameter of the obtained particles (5) was 15.6 μm.

The 5% thermal weight loss temperature of the obtained particles (5) when the temperature was increased at a rate of 10° C./min in a nitrogen atmosphere was 420° C.

Blending amounts, etc., are shown in Table 1.

Example 6

Particles (6) were obtained by performing the same operation as in Example 1, except that 1.8 g of a reactive low-molecular-weight polyphenylene ether (trade name "Noryl (registered trademark) SA9000-111 Resin", manufactured by SABIC INNOVATIVE PLASTICS IP B.V.) as a compound having an ether structure represented by formula (1), 1.2 g of divinylbenzene (DVB) 810 (81%-content product, manufactured by NIPPON STEEL Chemical & Material Co., Ltd., 19% is ethyl vinyl benzene (EVB)), 5.0 g of heptane, and 2.0 g of toluene were used instead of 2.5 g of the bifunctional polyphenylene ether oligomer (trade name "OPE-2St 1200", manufactured by MITSUBISHI GAS CHEMICAL COMPANY, INC.) as a compound having an ether structure represented by formula (1), 2.5 g of divinylbenzene (DVB) 810 (81%-content product, manufactured by NIPPON STEEL Chemical & Material Co., Ltd., 19% is ethyl vinyl benzene (EVB)), and 5.0 g of heptane.

Figure 7:
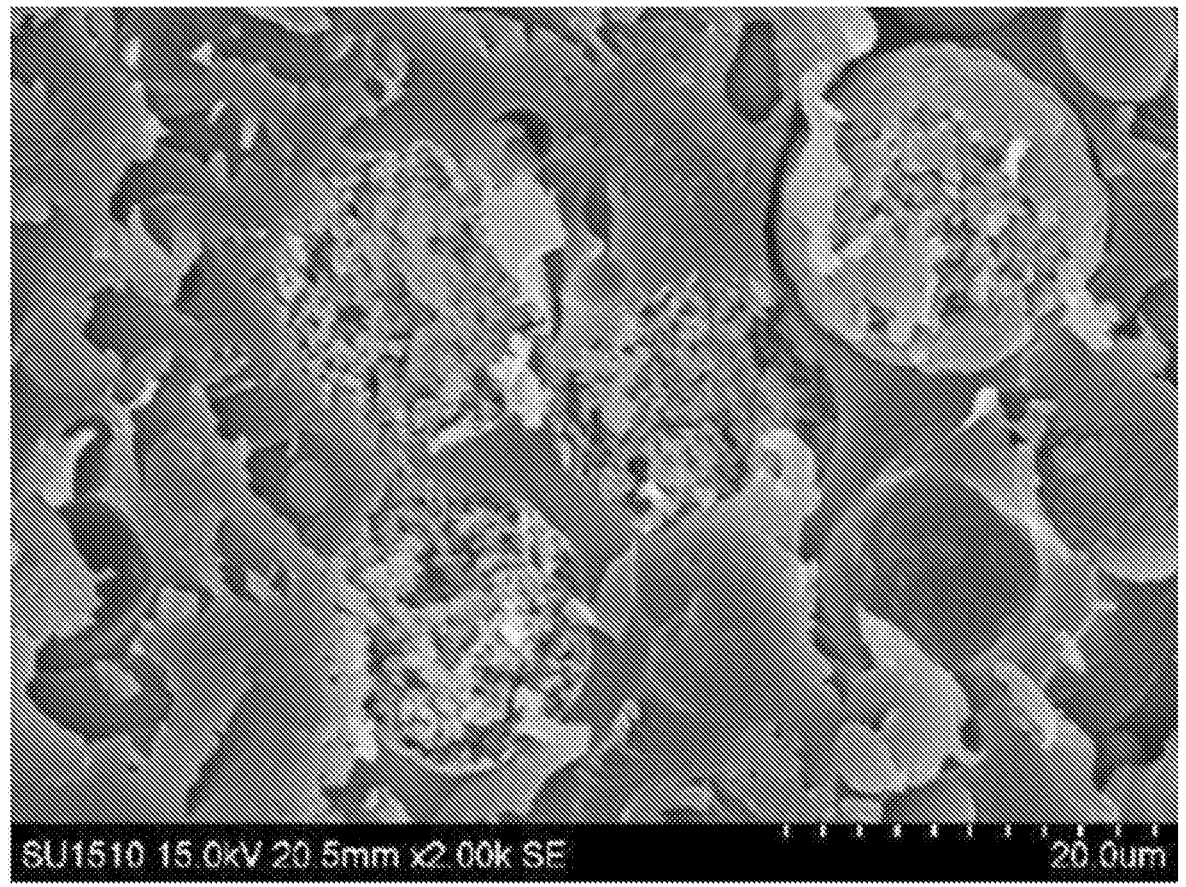
FIG. 7 is a cross-sectional photograph of hollow resin particles (6) obtained in Example 6.

A cross-sectional photograph of the obtained particles (6) is shown in FIG. 7. The obtained particles (6) were confirmed to be hollow resin particles in each of which a hollow surrounded by a shell was composed of a porous structure.

The average particle diameter of the obtained particles (6) was 15.1 μm.

The 5% thermal weight loss temperature of the obtained particles (6) when the temperature was increased at a rate of 10° C./min in a nitrogen atmosphere was 415° C.

Blending amounts, etc., are shown in Table 1.

Example 7

Particles (7) were obtained by performing the same operation as in Example 1, except that 4.0 g of a reactive low-molecular-weight polyphenylene ether (trade name "Noryl (registered trademark) SA9000-111 Resin", manufactured by SABIC INNOVATIVE PLASTICS IP B.V.) as a compound having an ether structure represented by formula (1), 1.0 g of divinylbenzene (DVB) 810 (81%-content product, manufactured by NIPPON STEEL Chemical & Material Co., Ltd., 19% is ethyl vinyl benzene (EVB)), 4.0 g of heptane, and 1.0 g of cyclohexane were used instead of 2.5 g of the bifunctional polyphenylene ether oligomer (trade name "OPE-2St 1200", manufactured by MITSUBISHI GAS CHEMICAL COMPANY, INC.) as a compound having an ether structure represented by formula (1), 2.5 g of divinylbenzene (DVB) 810 (81%-content product, manufactured by NIPPON STEEL Chemical & Material Co., Ltd., 19% is ethyl vinyl benzene (EVB)), and 5.0 g of heptane.

Figure 8:
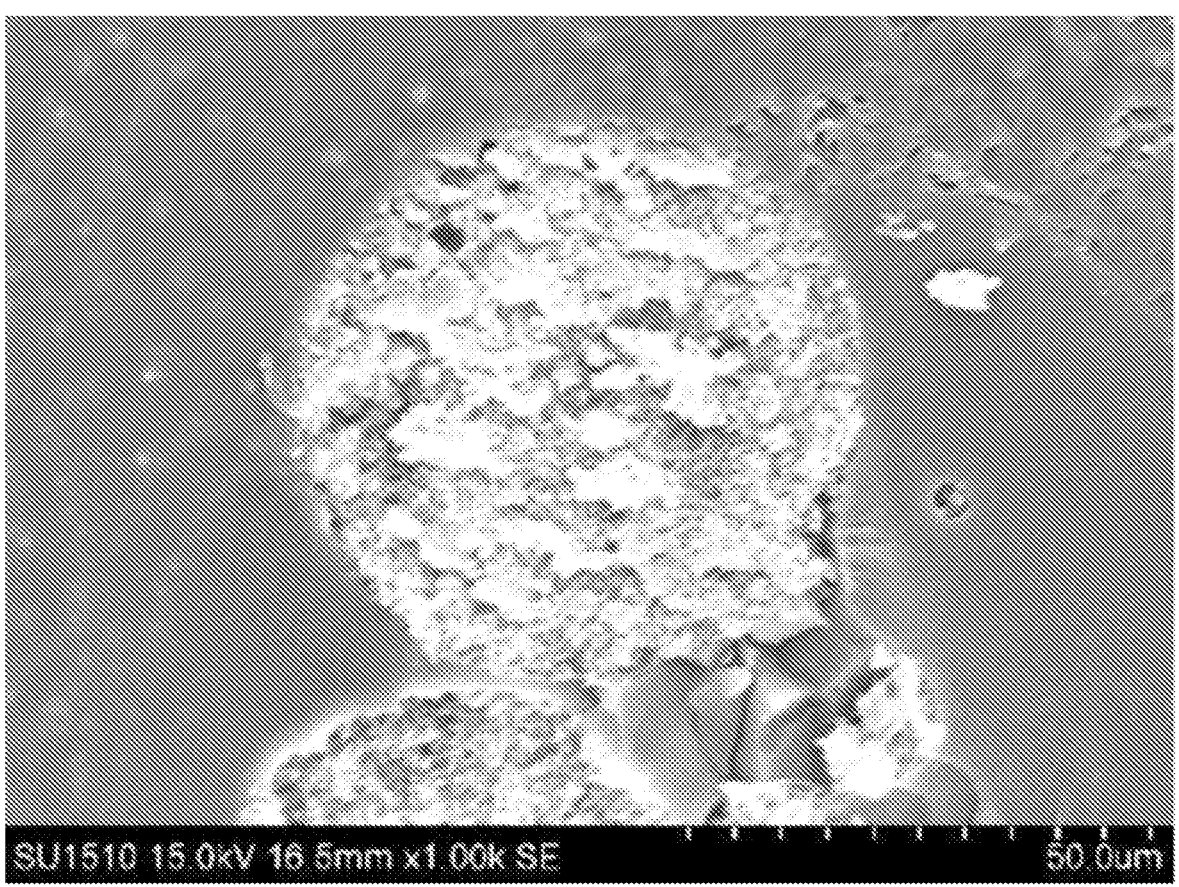
FIG. 8 is a cross-sectional photograph of hollow resin particles (7) obtained in Example 7.

A cross-sectional photograph of the obtained particles (7) is shown in FIG. 8. The obtained particles (7) were confirmed to be hollow resin particles in each of which a hollow surrounded by a shell was composed of a porous structure.

The average particle diameter of the obtained particles (7) was 13.1 μm.

The 5% thermal weight loss temperature of the obtained particles (7) when the temperature was increased at a rate of 10° C./min in a nitrogen atmosphere was 428° C.

Blending amounts, etc., are shown in Table 1.

Example 8

1.5 g of a bifunctional polyphenylene ether oligomer (trade name "OPE-2St 1200", manufactured by MITSUBISHI GAS CHEMICAL COMPANY, INC.) as a compound having an ether structure represented by formula (1), 1.5 g of divinylbenzene (DVB) 810 (81%-content product, manufactured by NIPPON STEEL Chemical & Material Co., Ltd., 19% is ethyl vinyl benzene (EVB)), 3.0 g of heptane, and 0.09 g of PEROYL L (manufactured by NOF CORPORATION) as a polymerization initiator were mixed to produce an oil phase.

Then, 34 g of ion-exchanged water and 0.0128 g of RAPISOL A-80 (manufactured by NOF CORPORATION) were mixed to produce an aqueous phase. The oil phase was added to the aqueous phase, and a suspension was prepared using an ultrasonic homogenizer ("SONIFIER 450", manufactured by Branson Ultrasonics Corporation, conditions: Duty Cycle=50%, Output Control=5, treatment time: 3 minutes). The obtained suspension was reacted by hearing at 70° C. for 4 hours. The obtained slurry was dried by heating at 100° C. for 24 hours to obtain particles (8).

Figure 9:
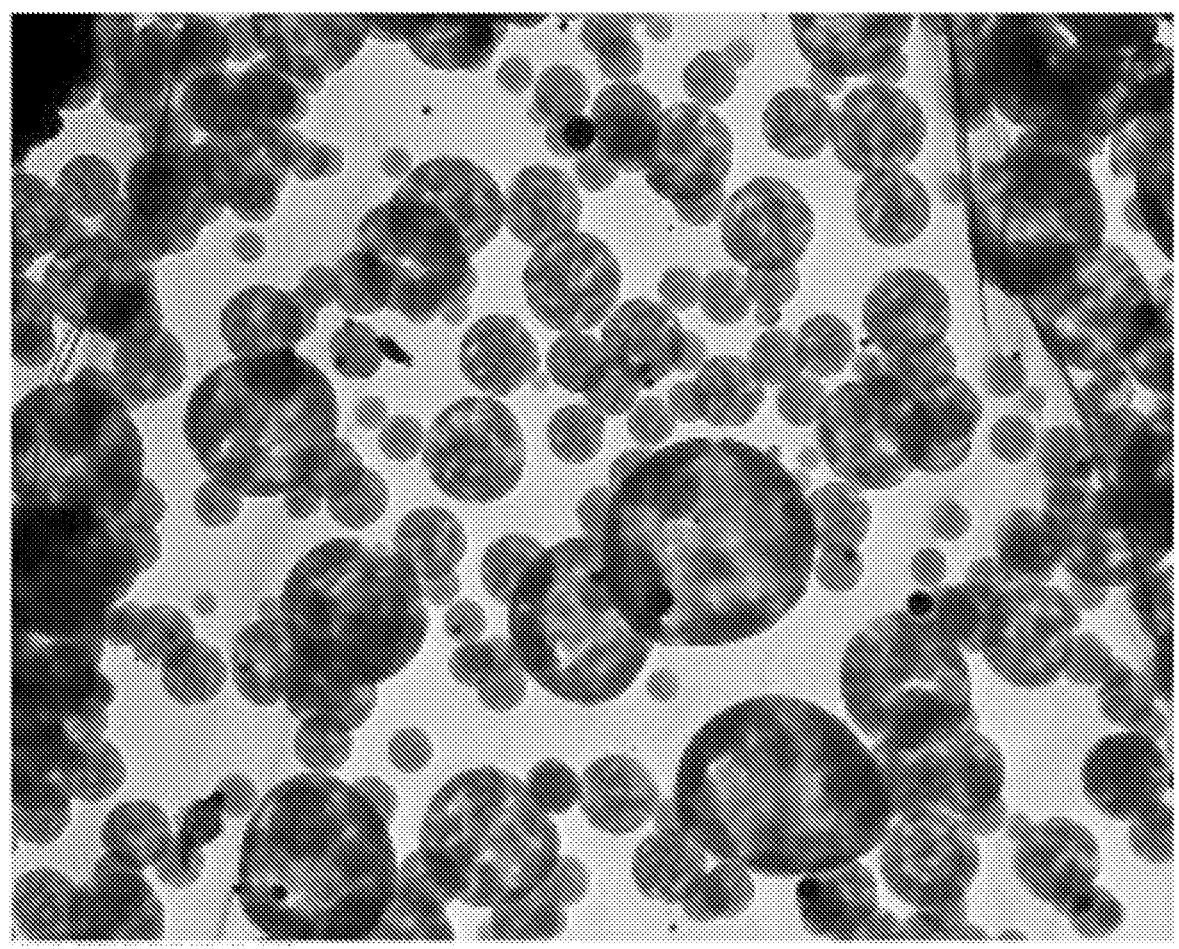
FIG. 9 is a TEM photograph of hollow resin particles (8) obtained in Example 8.

A TEM photograph of the obtained particles (8) is shown in FIG. 9. The obtained particles (8) were confirmed to be hollow resin particles in each of which a hollow surrounded by a shell was composed of a porous structure.

The average particle diameter of the obtained particles (8) was 320 nm.

The 5% thermal weight loss temperature of the obtained particles (8) when the temperature was increased at a rate of 10° C./min in a nitrogen atmosphere was 315° C.

Blending amounts, etc., are shown in Table 1.

Example 9

1.08 g of a reactive low-molecular-weight polyphenylene ether (trade name "Noryl (registered trademark) SA9000-111 Resin", manufactured by SABIC INNOVATIVE PLASTICS IP B.V.) as a compound having an ether structure represented by formula (1), 0.72 g of divinylbenzene (DVB) 810 (81%-content product, manufactured by NIPPON STEEL Chemical & Material Co., Ltd., 19% is ethyl vinyl benzene (EVB)), 3.0 g of heptane, 1.2 g of toluene, and 0.03 g of PEROYL L (manufactured by NOF CORPORATION) as a polymerization initiator were mixed to produce an oil phase.

Then, 34 g of ion-exchanged water and 0.0085 g of RAPISOL A-80 (manufactured by NOF CORPORATION) were mixed to produce an aqueous phase. The oil phase was added to the aqueous phase, and a suspension was prepared using an ultrasonic homogenizer ("SONIFIER 450", manufactured by Branson Ultrasonics Corporation, conditions: Duty Cycle=50%, Output Control=5, treatment time: 3 minutes). The obtained suspension was reacted by hearing at 70° C. for 4 hours. The obtained slurry was dried by heating at 100° C. for 24 hours to obtain particles (9).

Figure 10:
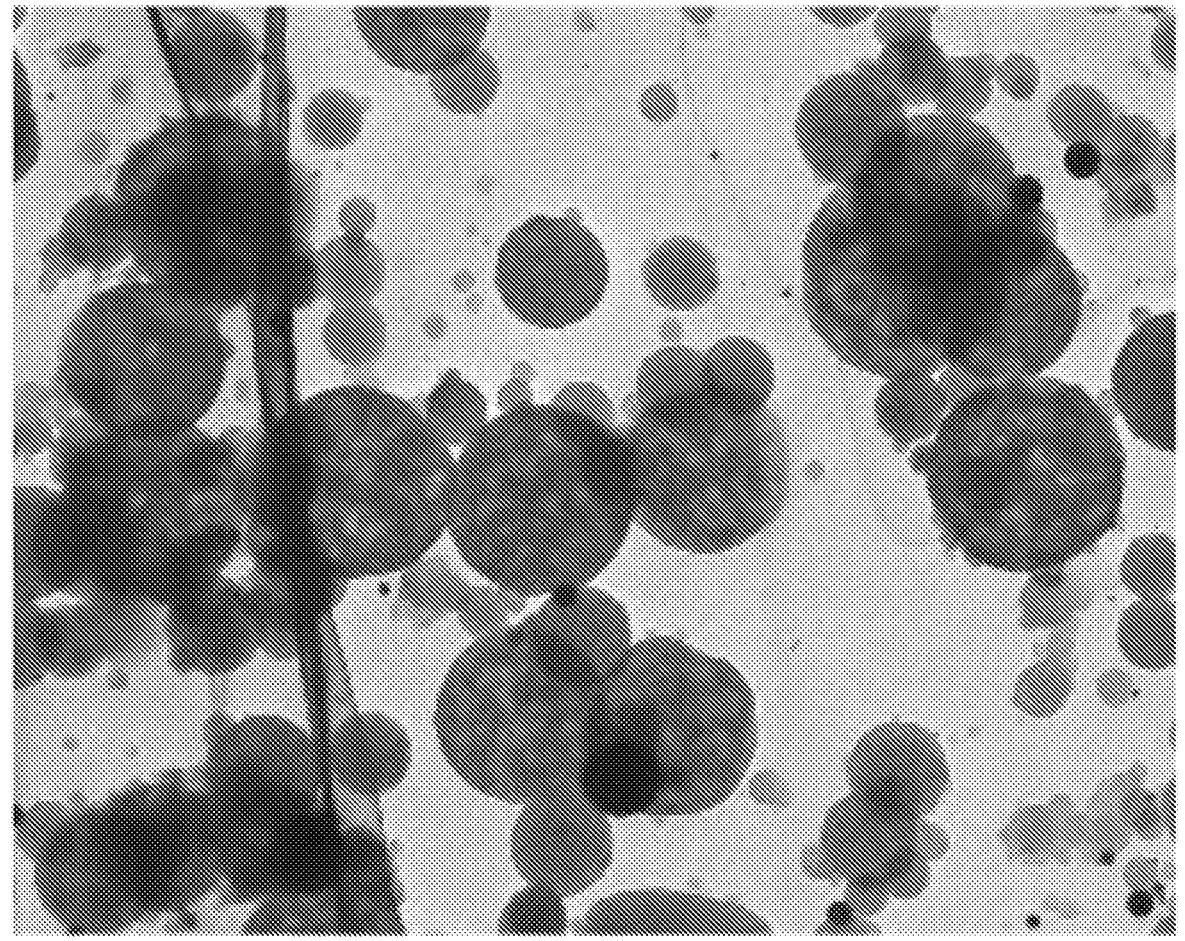
FIG. 10 is a TEM photograph of hollow resin particles (9) obtained in Example 9.

A TEM photograph of the obtained particles (9) is shown in FIG. 10. The obtained particles (9) were confirmed to be hollow resin particles in each of which a hollow surrounded by a shell was composed of a porous structure.

The average particle diameter of the obtained particles (9) was 379 nm.

The 5% thermal weight loss temperature of the obtained particles (9) when the temperature was increased at a rate of 10° C./min in a nitrogen atmosphere was 399° C.

Blending amounts, etc., are shown in Table 1.

Example 10

Particles (10) were obtained by performing the same operation as in Example 1, except that the amount of the bifunctional polyphenylene ether oligomer (trade name "OPE-2St 1200", manufactured by MITSUBISHI GAS CHEMICAL COMPANY, INC.) as a compound having an ether structure represented by formula (1) was set to 2.0 g, and the amount of divinylbenzene (DVB) 810 (81%-content product, manufactured by NIPPON STEEL Chemical & Material Co., Ltd., 19% is ethyl vinyl benzene (EVB)) was set to 3.0 g.

Figure 11:
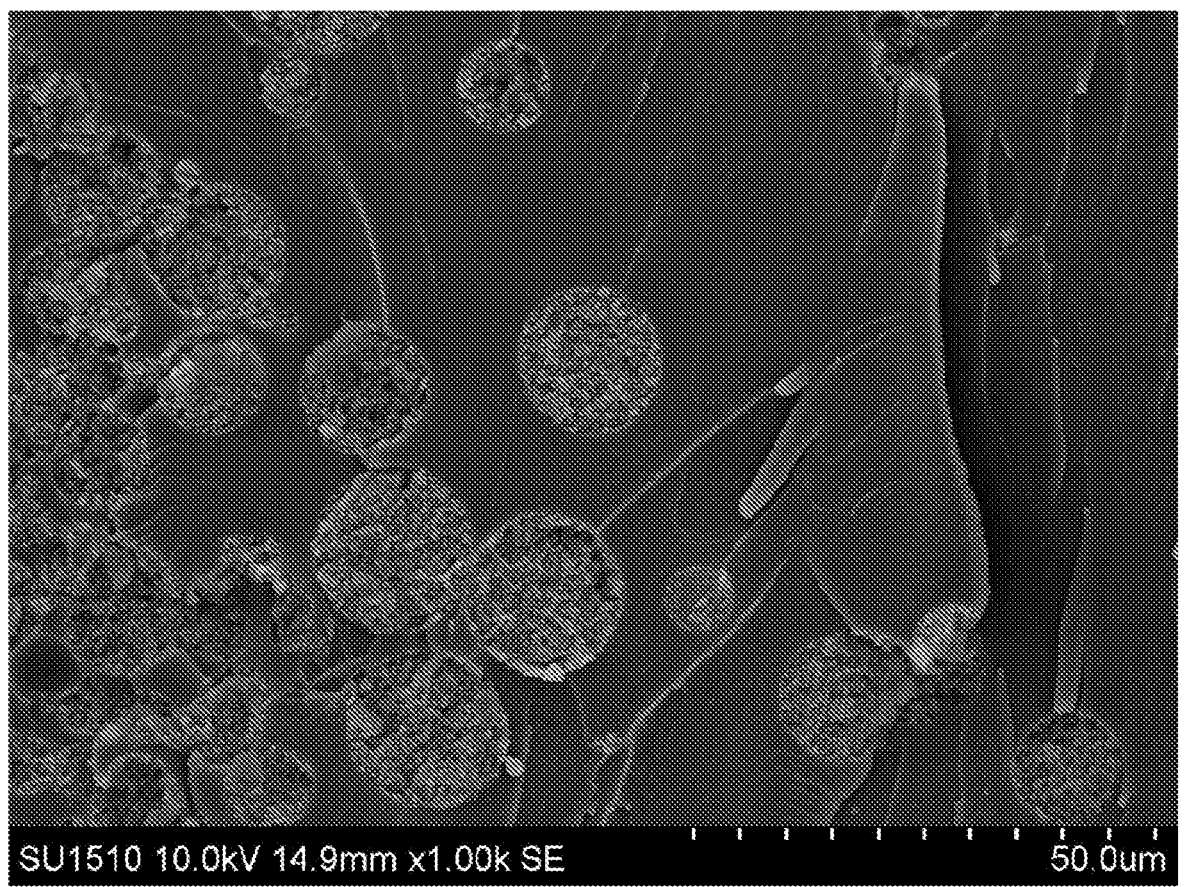
FIG. 11 is a cross-sectional photograph of hollow resin particles (10) obtained in Example 10.

A cross-sectional photograph of the obtained particles (10) is shown in FIG. 11. The obtained particles (10) were confirmed to be hollow resin particles in each of which a hollow surrounded by a shell was composed of a porous structure.

The average particle diameter of the obtained particles (10) was 14.4 μm.

The 5% thermal weight loss temperature of the obtained particles (10) when the temperature was increased at a rate of 10° C./min in a nitrogen atmosphere was 312° C.

Blending amounts, etc., are shown in Table 1.

Example 11

Particles (11) were obtained by performing the same operation as in Example 1, except that 2.0 g of a reactive low-molecular-weight polyphenylene ether (trade name "Noryl (registered trademark) SA9000-111 Resin", manufactured by SABIC INNOVATIVE PLASTICS IP B.V.) as a compound having an ether structure represented by formula (1) and 3.0 g of divinylbenzene (DVB) 810 (81%-content product, manufactured by NIPPON STEEL Chemical & Material Co., Ltd., 19% is ethyl vinyl benzene (EVB)) were used instead of 2.5 g of the bifunctional polyphenylene ether oligomer (trade name "OPE-2St 1200", manufactured by MITSUBISHI GAS CHEMICAL COMPANY, INC.) as a compound having an ether structure represented by formula (1) and 2.5 g of divinylbenzene (DVB) 810 (81%-content product, manufactured by NIPPON STEEL Chemical & Material Co., Ltd., 19% is ethyl vinyl benzene (EVB)).

Figure 12:
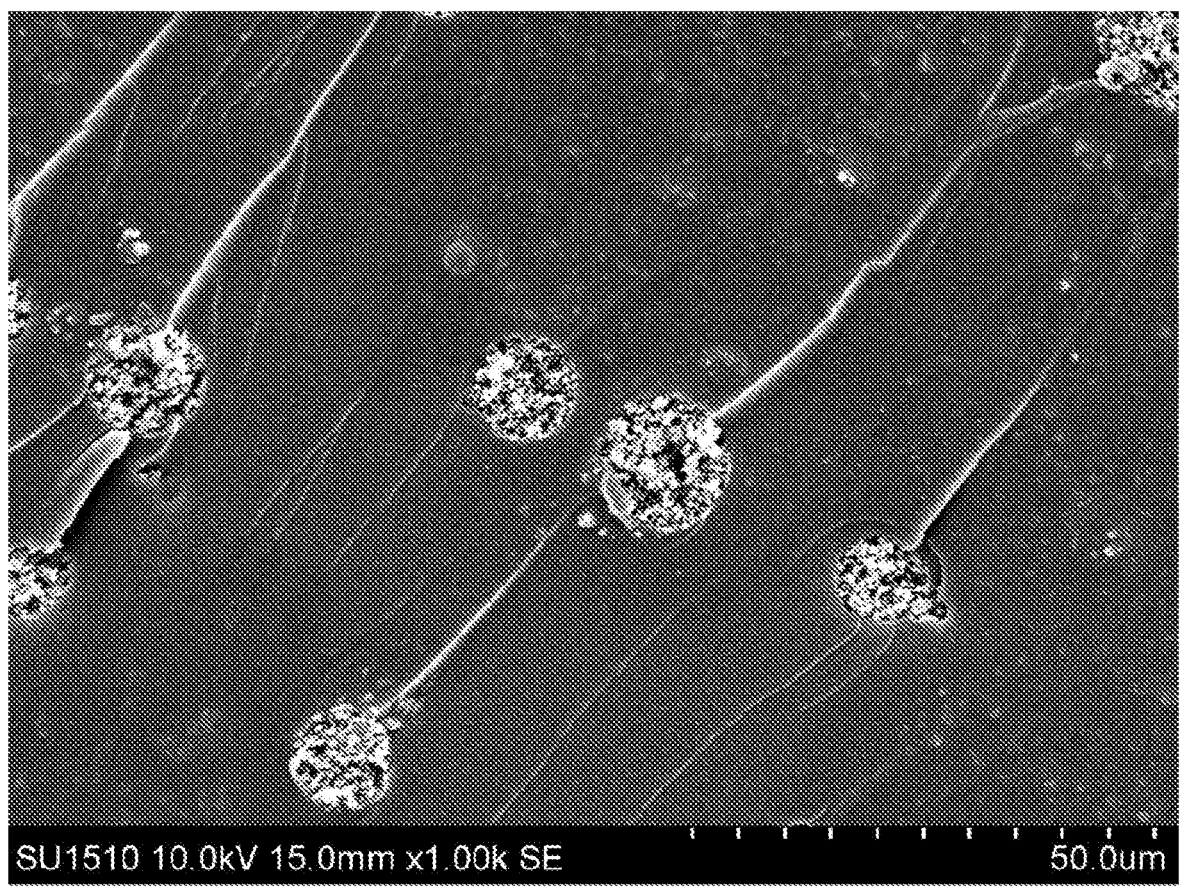
FIG. 12 is a cross-sectional photograph of hollow resin particles (11) obtained in Example 11.

A cross-sectional photograph of the obtained particles (11) is shown in FIG. 12. The obtained particles (11) were confirmed to be hollow resin particles in each of which a hollow surrounded by a shell was composed of a porous structure.

The average particle diameter of the obtained particles (11) was 12.7 μm.

The 5% thermal weight loss temperature of the obtained particles (11) when the temperature was increased at a rate of 10° C./min in a nitrogen atmosphere was 366° C.

Blending amounts, etc., are shown in Table 1.

Comparative Example 1

2.5 g of methyl methacrylate, 2.5 g of ethylene glycol dimethacrylate, 5 g of cyclohexane, 0.05 g of 2,2'-azobis(2, 4-dimethylvaleronitrile) (trade name "V-65", manufactured by FUJIFILM Wako Pure Chemical Corporation) as a polymerization initiator, and 0.004 g of lauryl phosphate were mixed to produce an oil phase.

The oil phase was added to 32 g of a 2 wt % magnesium pyrophosphate water dispersion liquid as an aqueous phase, and a suspension was prepared using a polytron homogenizer PT10-35 (manufactured by Central Scientific Commerce, Inc.). The obtained suspension was reacted by heating at 50° C. for 24 hours. Hydrochloric acid was added to the obtained slurry to decompose magnesium pyrophosphate, and the solids were then separated by dehydration through filtration, purified by repeated washing with water, and dried at 60° C. to obtain particles (C1) as dry powder.

Figure 13:
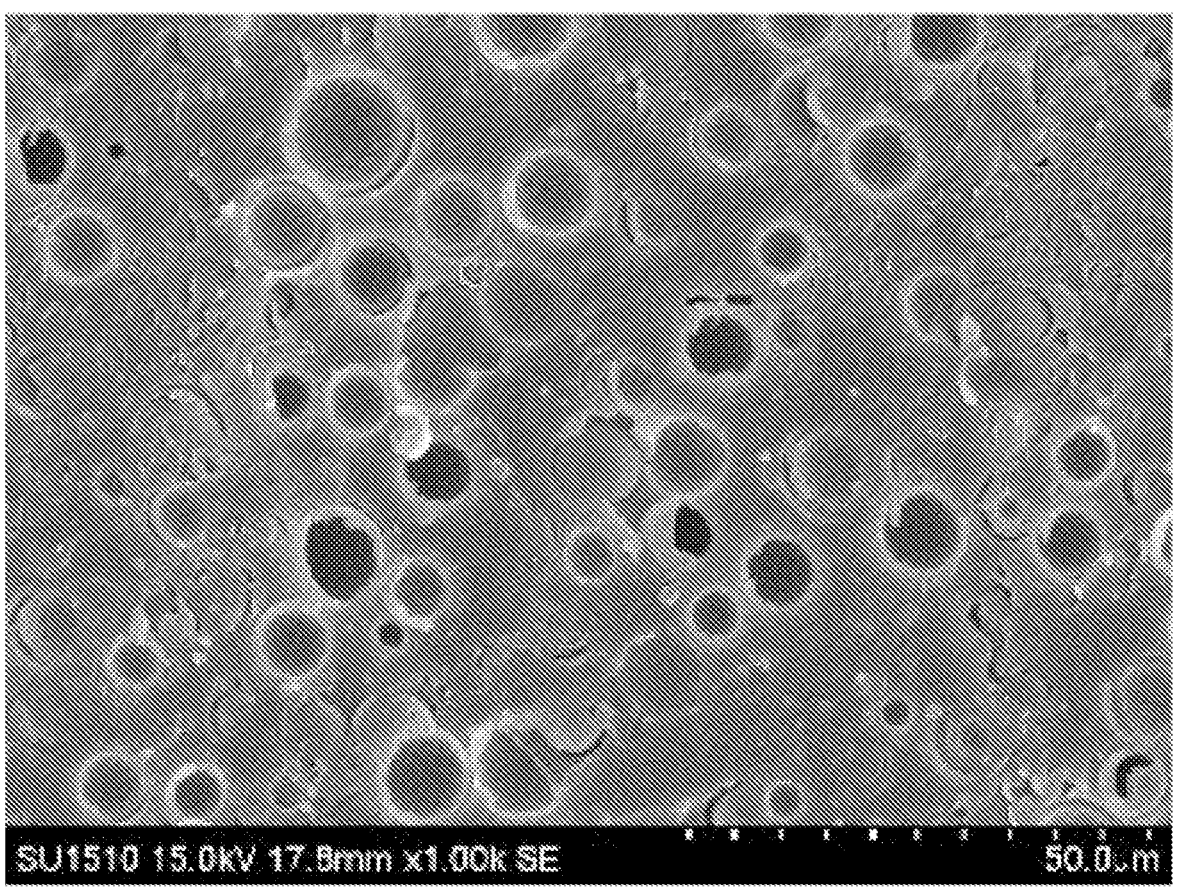
FIG. 13 is a cross-sectional photograph of particles (C1) obtained in Comparative Example 1.

A cross-sectional photograph of the obtained particles (C1) is shown in FIG. 13. The obtained particles (C1) were confirmed to be hollow resin particles in each of which a hollow surrounded by a shell was composed of one hollow region.

The average particle diameter of the obtained particles (C1) was 8.3 μm.

The 5% thermal weight loss temperature of the obtained particles (C1) when the temperature was increased at a rate of 10° C./min in a nitrogen atmosphere was 245° C.

Blending amounts, etc., are shown in Table 1.

Comparative Example 2

1.74 g of methyl methacrylate (MMA), 1.74 g of dipentaerythritol hexaacrylate (ADPH) (SHIN-NAKAMURA CHEMICAL Co., Ltd.), 2.4 g of toluene, 0.126 g of polystyrene (non-crosslinked, weight average molecular weight 300,000), and 0.104 g of PEROYL L (polymerization initiator, manufactured by NOF CORPORATION) were mixed to produce an oil phase.

Then, 34 g of ion-exchanged water and 0.034 g of RAPISOL A-80 (surfactant, manufactured by NOF CORPORATION) were mixed to produce an aqueous phase.

The oil phase was added to the aqueous phase, and a suspension was prepared using an ultrasonic homogenizer ("SONIFIER 450", manufactured by Branson Ultrasonics Corporation, conditions: Duty Cycle=50%, Output Control=5, treatment time: 3 minutes). Poymerization was carried out by heating the obtained suspension at 70° C. for 4 hours to obtain a slurry. The obtained slurry was dried by heating at 100° C. for 24 hours to obtain particles (C2) as dry powder.

Figure 14:
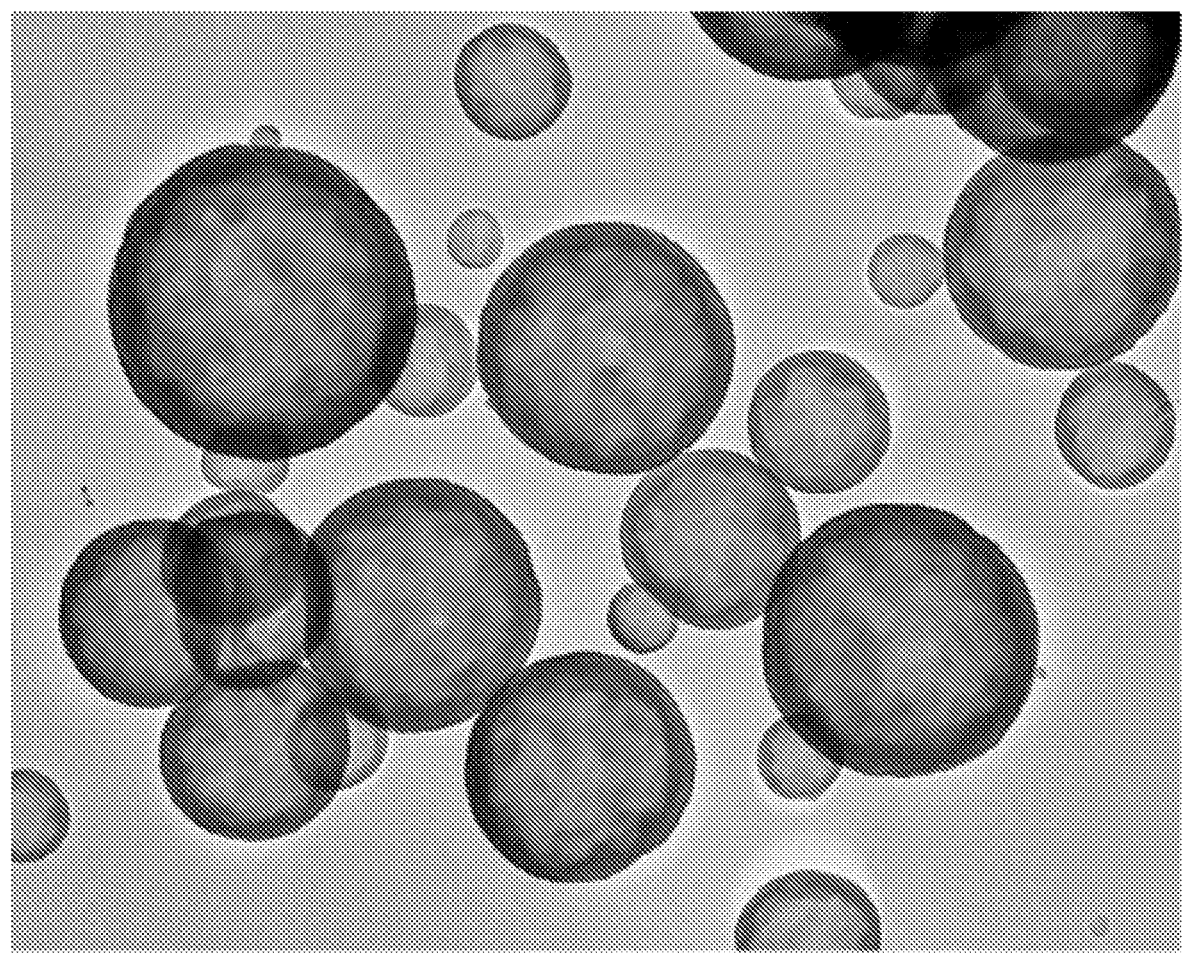
FIG. 14 is a TEM photograph of particles (C2) obtained in Comparative Example 2.

A TEM photograph of the obtained particles (C2) is shown in FIG. 14. The obtained particles (C2) were confirmed to be hollow resin particles in each of which a hollow surrounded by a shell was composed of one hollow region.

The average particle diameter of the obtained particles (C2) was 478 nm, and the particle density thereof was 0.614 g/cm$^3$.

The 5% thermal weight loss temperature of the obtained particles (C2) when the temperature was increased at a rate of 10° C./min in a nitrogen atmosphere was 327° C.

Blending amounts, etc., are shown in Table 1.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Oil phase (parts by weight) | OPE-2St 1200 | 2.5 | 3.0 | 3.5 | — | — | — | — |
| | SA9000-111 | — | — | — | 2.5 | 3.0 | 1.8 | 4.0 |
| | DVB 810 DVB: 81% EVB: 19% | 2.5 | 2.0 | 1.5 | 2.5 | 2.0 | 1.2 | 1.0 |
| | Methyl methacrylate | — | — | — | — | — | — | — |
| | Ethylene glycol dimethacrylate | — | — | — | — | — | — | — |
| | Dipentaerythritol hexaacrylate | — | — | — | — | — | — | — |
| | Heptane | 5.0 | 5.0 | 5.0 | 5.0 | 5.0 | 5.0 | 4.0 |
| | Toluene | — | — | — | — | — | 2.0 | — |
| | Cyclohexane | — | — | — | — | — | — | 1.0 |
| | Polystyrene | — | — | — | — | — | — | — |
| | V-65 | 0.05 | 0.05 | 0.05 | 0.05 | 0.05 | 0.05 | 0.05 |
| | PEROYL L | — | — | — | — | — | — | — |
| | Lauryl phosphate | 0.004 | 0.004 | 0.004 | 0.004 | 0.004 | 0.004 | 0.004 |
| Aqueous phase (parts by weight) | 2 wt % magnesium pyrophosphate water dispersion | 32 | 32 | 32 | 32 | 32 | 32 | 32 |
| | Ion-exchanged water | — | — | — | — | — | — | — |
| | A-80 | — | — | — | — | — | — | — |
| Average particle diameter (μm) | | 16.3 | 15.2 | 13.9 | 16.5 | 15.6 | 15.1 | 13.1 |
| 5% thermal weight loss temperature (° C.) | | 306 | 320 | 309 | 373 | 420 | 415 | 428 |

| | | Ex. 8 | Ex. 9 | Ex. 10 | Ex. 11 | Comp. Ex. 1 | Comp. Ex. 2 |
|---|---|---|---|---|---|---|---|
| Oil phase (parts by weight) | OPE-2St 1200 | 1.5 | — | 2.0 | — | — | — |
| | SA9000-111 | — | 1.08 | — | 2.0 | — | — |
| | DVB 810 DVB: 81% EVB: 19% | 1.5 | 0.72 | 3.0 | 3.0 | — | — |
| | Methyl methacrylate | — | — | — | — | 2.5 | 1.74 |
| | Ethylene glycol dimethacrylate | — | — | — | — | 2.5 | — |
| | Dipentaerythritol hexaacrylate | — | — | — | — | — | 1.74 |
| | Heptane | 3.0 | 3.0 | 5.0 | 5.0 | — | — |
| | Toluene | — | 1.2 | — | — | — | 2.4 |
| | Cyclohexane | — | — | — | — | 5.0 | — |
| | Polystyrene | — | — | — | — | — | 0.126 |
| | V-65 | — | — | 0.05 | 0.05 | — | — |
| | PEROYL L | 0.09 | 0.03 | — | — | 0.05 | 0.104 |
| | Lauryl phosphate | — | — | 0.004 | 0.004 | 0.004 | — |

TABLE 1-continued

| | | | | | | | |
|---|---|---|---|---|---|---|---|
| Aqueous phase (parts by weight) | 2 wt % magnesium pyrophosphate water dispersion | — | — | 32 | 32 | 32 | — |
| | Ion-exchanged water | 34 | 34 | — | — | — | 34 |
| | A-80 | 0.0128 | 0.0085 | — | — | — | 0.034 |
| Average particle diameter (µm) | | 0.320 | 0.379 | 14.4 | 12.7 | 8.3 | 0.478 |
| 5% thermal weight loss temperature (°C.) | | 315 | 399 | 312 | 366 | 245 | 327 |

Performance Evaluation 1: Relative Dielectric Constant/Dielectric Loss Tangent Evaluation 1

0.4 g of the particles obtained in each of the Examples and the Comparative Example and 10 g of a ultra-high-heat-resistance polyimide varnish (trade name "SPIXAREA HR (registered trademark) 002", manufactured by SOMAR CORPORATION) were defoamed and stirred using a planetary stirring defoamer ("Mazerustar KK-250", manufactured by Kurabo Industries Ltd.) to produce a mixture for evaluation.

The mixture for evaluation was applied to a glass plate having a thickness of 5 mm, using an applicator set to a wet thickness of 250 µm, and then the solvent was removed by heating at 120° C. for 10 minutes, at 180° C. for 180 minutes, and at 270° C. for 60 minutes, followed by cooling to room temperature. Thus, a film sample containing the particles was obtained. The obtained film was evaluated for relative dielectric constant and dielectric loss tangent by a cavity resonance method (measurement frequency: 5.8 GHz). The results are shown in Table 2.

dielectric loss tangent of the base material, and thus are found to be effective for the purpose of achieving reductions in dielectricity and dielectric loss tangent of a semiconductor material.

Performance Evaluation 2: Relative Dielectric Constant/Dielectric Loss Tangent Evaluation 2

0.425 g of the particles obtained in each of the Examples and the Comparative Example, 12.1 g of ethyl acetate, and 1.7 g of solvent-soluble polyimide KPI-MX300F (manufactured by Kawamura Sangyo Co., Ltd.) were defoamed and stirred using a planetary stirring defoamer ("Mazerustar KK-250", manufactured by Kurabo Industries Ltd.) to produce a mixture for evaluation.

The mixture for evaluation was applied to a glass plate having a thickness of 5 mm, using an applicator set to a wet thickness of 250 µm, and then ethyl acetate was removed by heating at 60° C. for 30 minutes, at 90° C. for 10 minutes, at 150° C. for 30 minutes, and at 200° C. for 30 minutes, followed by cooling to room temperature. Thus, a film sample containing the particles was obtained. The obtained

TABLE 2

| | Film containing particles (2) of Example 2 | Film containing particles (5) of Example 5 | Film containing particles (C2) of Comparative Example 2 | Film containing no particles (reference) |
|---|---|---|---|---|
| Relative dielectric constant | 2.64 | 2.68 | 3.13 | 3.45 |
| Dielectric loss tangent | 0.0290 | 0.0290 | 0.0322 | 0.0321 |

From the results of Table 2, the hollow resin particles provided by the present invention can be confirmed to have the effect of reducing the relative dielectric constant and the film was evaluated for relative dielectric constant and dielectric loss tangent by a cavity resonance method (measurement frequency: 5.8 GHz). The results are shown in Table 3.

TABLE 3

| | Film containing particles (2) of Example 2 | Film containing particles (5) of Example 5 | Film containing particles (C1) of Comparative Example 1 | Film containing particles (C2) of Comparative Example 2 | Film containing no particles (reference) |
|---|---|---|---|---|---|
| Relative dielectric constant | 1.90 | 2.01 | 2.25 | 2.39 | 2.46 |
| Dielectric loss tangent | 0.0060 | 0.0057 | 0.0105 | 0.0160 | 0.0093 |

From the results of Table 3, the hollow resin particles provided by the present invention can be confirmed to have the effect of reducing the relative dielectric constant and the dielectric loss tangent of the base material, and thus are found to be effective for the purpose of achieving reductions in dielectricity and dielectric loss tangent of a semiconductor material.

Performance Evaluation 3: Moisture Content Evaluation

The particles obtained in each of the Examples and the Comparative Example were subjected to moisture absorption treatment under the following conditions.

The particles obtained in each of the Examples and the Comparative Example were placed in a constant temperature and humidity chamber at a temperature of 40±1° C. and a relative humidity of 95% for 96 hours, then taken out therefrom, and cooled for 30 minutes in an environment having a temperature of 20±1° C. and a humidity of 65±5%. After cooling, the moisture content was measured.

The moisture content was measured by using 0.1 g of the particles obtained in each of the Examples and the Comparative Example as a sample and setting the sample on a "CA-200" Karl Fischer moisture measurement apparatus and a "VA-236S" moisture vaporizer manufactured by Mitsubishi Chemical Analytech Co., Ltd. As an anolyte and a catholyte in the measurement, trade name "AQUAMICRON (registered trademark) AX" and trade name "AQUAMICRON (registered trademark) CXU" manufactured by Mitsubishi Chemical Corporation were used, respectively. The measurement (vaporization) temperature was set to 250° C. Nitrogen was used as the carrier gas. The flow rate of the carrier gas was set to 150 mL/min. The number of times the sample was tested was three times. The moisture content in the air only at the sample collection site was measured twice, and the average value thereof was used as a blank value. The moisture content (wt %) of the sample was determined by subtracting the blank value from each measurement result and dividing the resultant value by the sample weight. The moisture content (wt %) of the sample was calculated by the following equation.

Moisture content (wt %)=[Measured moisture amount (μg)−blank moisture amount (μg)]÷1000000÷sample weight (g)×100

As a final result, the results of the three measurements were averaged to determine the moisture content (wt %) of the sample. The results are shown in Table 4.

Performance Evaluation 4: Heat Insulation Evaluation

To 10 g of a commercially available water-based paint (trade name "Water-Based Multi-Use Color Clear", manufactured by ASAHIPEN CORPORATION), 2.5 g of the particles (1) obtained in Example 1 were added, and the mixture was defoamed and stirred using a planetary stirring defoamer ("Mazerustar KK-250", manufactured by Kurabo Industries Ltd.) to produce a paint for evaluation.

The paint for evaluation was applied to the black side of a contrast ratio test sheet using an applicator set to a wet thickness of 250 μm, and then dried sufficiently at room temperature to obtain a sample plate for light reflectivity evaluation. The sample plate for light reflectivity evaluation was evaluated for reflectances for ultraviolet light, visible light, and near-infrared light in the following point order.

A UV-visible near-infrared spectrophotometer ("SolidSpec-3700", manufactured by SHIMADZU CORPORATION) was used as a reflectance measurement apparatus, and the reflection characteristics for ultraviolet light to near-infrared light (wavelength 300 nm to 2500 nm) of the coating surface of the sample plate for light reflectivity evaluation were measured as reflectance (%). The measurement was performed using a 60 mmϕ integrating sphere and Spectralon as a standard white plate.

Figure 15:
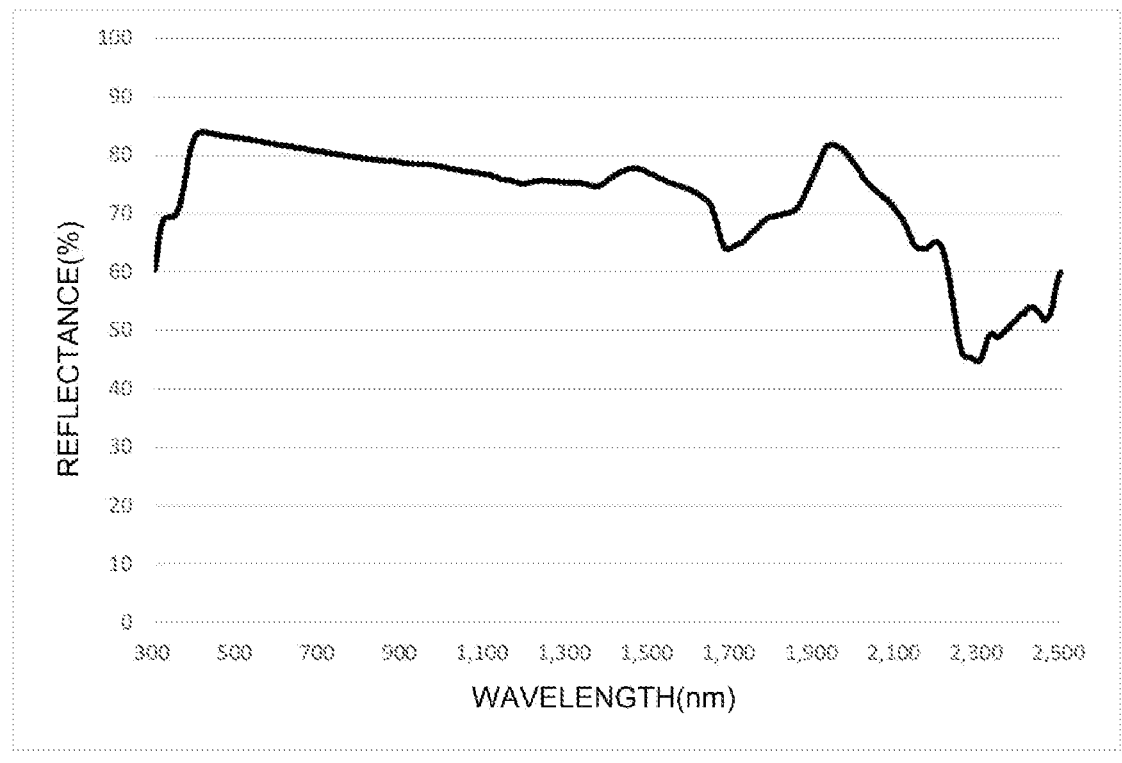
FIG. 15 is an ultraviolet-visible-near-infrared spectral reflectance spectral diagram of the hollow resin particles (1) obtained in Example 1.

The results obtained are shown in FIG. 15. As shown in FIG. 15, the reflectance is found to be a high reflectance of 40% or higher at almost all the wavelengths of ultraviolet light to near-infrared light.

Performance Evaluation 5: Paint Film Appearance Evaluation 2 parts by weight of the particles (1) obtained in Example 1 and 20 parts by weight of a commercially available acrylic water-based glossy paint (trade name "Super Hit", manufactured by Kanpe Hapio Co., Ltd.) were mixed for 3 minutes and defoamed for 1 minute using a stirring defoamer, to obtain a paint composition.

The obtained paint composition was applied to an ABS resin (acrylonitrile-butadiene-styrene resin) plate using a coating apparatus set with a 75 μm-clearance blade, and then dried to obtain a paint film.

Also, the obtained paint composition was sprayed onto an acrylic plate having a thickness of 3 mm, to create a matte paint film having a thickness of 50 μm. The obtained paint film showed no protrusions and had good matte properties.

TABLE 4

|  | Particles (1) of Ex. 1 | Particles (2) of Ex. 2 | Particles (3) of Ex. 3 | Particles (4) of Ex. 4 | Particles (5) of Ex. 5 | Particles (6) of Ex. 6 | Particles (7) of Ex. 7 | Particles (C1) of Comp. Ex. 1 | Particles (C2) of Comp. Ex. 2 |
|---|---|---|---|---|---|---|---|---|---|
| Moisture content (wt %) | 0.29 | 0.35 | 0.42 | 0.24 | 0.18 | 0.49 | 0.31 | 3.18 | 6.33 |

From the results of Table 4, it is found that the hollow resin particles provided by the present invention have a lower moisture content after moisture absorption treatment than conventional hollow resin particles, and thus are also suitable for the purpose of achieving reductions in dielectricity and dielectric loss tangent of a semiconductor material.

Performance Evaluation 6: Light-Diffusing Properties Evaluation 7.5 parts by weight of the particles (1) obtained in Example 1, 30 parts by weight of an acrylic resin (trade name "ACRYDIC A811", manufactured by DIC Corporation), 10 parts by weight of a crosslinking agent (trade name "VM-D", manufactured by DIC Corporation), and 50 parts by weight of butyl acetate as a solvent were mixed for 3 minutes and defoamed for 1 minute using a stirring defoamer, to obtain a light-diffusible resin composition.

The obtained light-diffusible resin composition was applied to a PET film having a thickness of 125 μm using a coating apparatus set with a 50 μm-clearance blade, and then dried at 70° C. for 10 minutes to obtain a light-diffusing film.

The total light transmittance and haze of the obtained light-diffusing film were measured using a haze meter (trade name "NDH 2000", manufactured by NIPPON DEN-SHOKU INDUSTRIES CO., LTD.) according to JIS K 7361-1: 1997 and JIS K 7136: 2000, respectively. The higher the diffusibility of light transmitted through the light-diffusing film (transmitted light), the higher the haze value.

As a result of the measurements, the haze and the total light transmittance were 40.2% and 81.5%, respectively, and thus it is recognized that the obtained light-diffusing film has excellent light-diffusing properties.

INDUSTRIAL APPLICABILITY

The hollow resin particle according to the embodiment of the present invention and the hollow resin particle obtained by the production method according to the embodiment of the present invention can be used for semiconductor materials, etc. The hollow resin particle according to the embodiment of the present invention and the hollow resin particle obtained by the production method according to the embodiment of the present invention can be applied to applications such as resin compositions for a semiconductor component, paint compositions, heat-insulating compositions, light-diffusible compositions, and light-diffusing films.

The invention claimed is:

1. A hollow resin particle comprising a shell portion and a hollow portion surrounded by the shell portion, wherein the shell portion has an ether structure represented by formula (1), (1)

and
wherein the hollow resin particle has an average particle diameter of 0.3 μm to 50.0 μm.

2. The hollow resin particle according to claim 1, wherein the hollow portion is composed of one hollow region.

3. The hollow resin particle according to claim 1, wherein the hollow portion is composed of a plurality of hollow regions.

4. The hollow resin particle according to claim 1, wherein the hollow portion is composed of a porous structure.

5. The hollow resin particle according to claim 1, wherein the hollow resin particle has a 5% thermal weight loss temperature of 300° C. or higher when a temperature of the hollow resin particle is increased at a rate of 10° C./min in a nitrogen atmosphere.

6. The hollow resin particle according to claim 1, wherein the hollow resin particle is used for a resin composition for a semiconductor component.

7. The hollow resin particle according to claim 1, wherein the hollow resin particle is used for a paint composition.

8. The hollow resin particle according to claim 1, wherein the hollow resin particle is used for a heat-insulating resin composition.

9. The hollow resin particle according to claim 1, wherein the hollow resin particle is used for a light-diffusible resin composition.

10. The hollow resin particle according to claim 1, wherein the hollow resin particle is used for a light-diffusing film.

11. The hollow resin particle according to claim 1, wherein the hollow resin particle has an average particle diameter of 0.3 μm to 30.0 μm.

12. The hollow resin particle according to claim 1, wherein the hollow resin particle has an average particle diameter of 0.3 μm to 20.0 μm.

13. A resin composition for a semiconductor component, containing the hollow resin particle according to claim 1.

14. A paint composition containing the hollow resin particle according to claim 1.

15. A heat-insulating resin composition containing the hollow resin particle according to claim 1.

16. A light-diffusible resin composition containing the hollow resin particle according to claim 1.

17. A light-diffusing film containing the hollow resin particle according to claim 1.

18. A method for producing the hollow resin particle according to claim 1, the method comprising reacting 20 parts by weight to 80 parts by weight of a compound (A) having an ether structure represented by formula (1) and 80 parts by weight to 20 parts by weight of a monomer (B) which reacts with the compound (A) (a total amount of the compound (A) and the monomer (B) is 100 parts by weight), in an aqueous medium in the presence of a non-reactive solvent, (1)

* * * * *